(12) United States Patent
Byrd et al.

(10) Patent No.: US 12,367,498 B2
(45) Date of Patent: Jul. 22, 2025

(54) CARBON MANAGEMENT SYSTEMS AND METHOD FOR MANAGEMENT OF CARBON USE AND/OR PRODUCTION IN BUILDINGS

(71) Applicant: CARBONQUEST, INC., Spokane Valley, WA (US)

(72) Inventors: Ken Byrd, Spokane, WA (US); Shane Johnson, Rosalia, WA (US)

(73) Assignee: CARBONQUEST, INC., Spokane Valley, WA (US)

( * ) Notice: Subject to any disclaimer, the term of this patent is extended or adjusted under 35 U.S.C. 154(b) by 432 days.

(21) Appl. No.: 17/963,592

(22) Filed: Oct. 11, 2022

(65) Prior Publication Data

US 2023/0112087 A1    Apr. 13, 2023

Related U.S. Application Data

(60) Provisional application No. 63/254,432, filed on Oct. 11, 2021.

(51) Int. Cl.
*G05B 99/00* (2006.01)
*G05B 13/02* (2006.01)
*G06Q 30/018* (2023.01)

(52) U.S. Cl.
CPC ....... *G06Q 30/018* (2013.01); *G05B 13/0265* (2013.01)

(58) Field of Classification Search
CPC .............................................. G05B 2219/2614
See application file for complete search history.

(56) References Cited

U.S. PATENT DOCUMENTS

| | | |
|---|---|---|
| 2,802,719 A | 8/1957 | Avedikian |
| 4,283,212 A | 8/1981 | Graham et al. |
| 4,284,055 A | 8/1981 | Wakeman |
| 4,391,227 A | 7/1983 | Forster et al. |
| 4,484,933 A | 11/1984 | Cohen |
| 4,823,710 A | 4/1989 | Garrido et al. |
| 5,203,159 A | 4/1993 | Koizumi et al. |
| 5,536,893 A | 7/1996 | Gudmundsson |
| 6,170,264 B1 | 1/2001 | Viteri et al. |
| 7,056,482 B2 | 6/2006 | Hakka et al. |
| 7,594,956 B2 | 9/2009 | Knaebel |
| 7,727,374 B2 | 6/2010 | Jones |
| 8,226,917 B2 | 7/2012 | Fan et al. |
| 8,353,978 B2 | 1/2013 | Knaebel |

(Continued)

FOREIGN PATENT DOCUMENTS

| | | |
|---|---|---|
| CA | 2634256 | 7/2007 |
| CA | 2362773 | 12/2009 |

(Continued)

OTHER PUBLICATIONS

WO PCT/US2020/030533 IPRP, Nov. 11, 2021, Carbonquest, Inc.

(Continued)

*Primary Examiner* — Suresh Suryawanshi
(74) *Attorney, Agent, or Firm* — Wells St. John P.S.

(57) ABSTRACT

Carbon management systems and carbon optimization systems are provided. The systems can include: processing circuitry operably coupled to a carbon site control module, wherein the carbon site control module is operably engaged with one or more of a carbon resource module, a carbon capture control module, and/or a building management system.

8 Claims, 34 Drawing Sheets

(56) References Cited

U.S. PATENT DOCUMENTS

| | | |
|---|---|---|
| 8,413,420 B1 | 4/2013 | Zaromb |
| 8,741,244 B2 | 6/2014 | Jones |
| 9,637,393 B2 | 5/2017 | Heidel et al. |
| 10,099,176 B2 | 10/2018 | Ateya Soliman |
| 10,676,799 B2 | 6/2020 | Berlowitz et al. |
| 10,718,055 B2 | 7/2020 | Ren et al. |
| 2002/0166323 A1 | 11/2002 | Marin et al. |
| 2004/0231332 A1 | 11/2004 | Saucedo et al. |
| 2005/0045030 A1 | 3/2005 | Tonkovich et al. |
| 2005/0199231 A1 | 9/2005 | Heider |
| 2005/0229871 A1 | 10/2005 | Robertson |
| 2006/0099110 A1 | 5/2006 | Shirakura |
| 2008/0121105 A1 | 5/2008 | Schubert et al. |
| 2008/0302133 A1 | 12/2008 | Saysset et al. |
| 2009/0214407 A1 | 8/2009 | Reyes et al. |
| 2009/0241490 A1 | 10/2009 | Lack |
| 2010/0083697 A1 | 4/2010 | Degenstein et al. |
| 2010/0180889 A1 | 7/2010 | Monzyk et al. |
| 2010/0198736 A1 | 8/2010 | Marino |
| 2010/0212555 A1 | 8/2010 | Yamada et al. |
| 2010/0288172 A1 | 11/2010 | Jukkola et al. |
| 2011/0005272 A1 | 1/2011 | Wijmans et al. |
| 2011/0195473 A1 | 8/2011 | Wilhelm |
| 2011/0293503 A1 | 12/2011 | Wright et al. |
| 2012/0060689 A1 | 3/2012 | Naumovitz et al. |
| 2012/0227644 A1 | 9/2012 | Uchida et al. |
| 2012/0285162 A1 | 11/2012 | Ahn et al. |
| 2013/0202517 A1 | 8/2013 | Ayala et al. |
| 2013/0283852 A1 | 10/2013 | Sipocz et al. |
| 2013/0323657 A1 | 12/2013 | Ludwing et al. |
| 2014/0041562 A1 | 2/2014 | Grubbstrom |
| 2014/0089078 A1* | 3/2014 | Dessert ............... G06Q 30/0238 705/14.38 |
| 2014/0116358 A1 | 5/2014 | Stallmann |
| 2014/0194539 A1 | 7/2014 | Hammad et al. |
| 2014/0261245 A1 | 9/2014 | Patrick et al. |
| 2014/0287235 A1 | 9/2014 | Chang et al. |
| 2014/0298996 A1 | 10/2014 | Meirav et al. |
| 2015/0047989 A1 | 2/2015 | Huang |
| 2015/0079526 A1 | 3/2015 | Lou et al. |
| 2015/0190748 A1 | 7/2015 | Liu et al. |
| 2015/0329369 A1 | 11/2015 | Heidel et al. |
| 2015/0360168 A1 | 12/2015 | Zubrin et al. |
| 2016/0305655 A1 | 10/2016 | Tulokas |
| 2016/0356489 A1 | 12/2016 | Matsumoto et al. |
| 2016/0363368 A1 | 12/2016 | Zanganeh et al. |
| 2017/0003246 A1 | 1/2017 | Shuk et al. |
| 2017/0138222 A1 | 5/2017 | Sundaram et al. |
| 2017/0271701 A1 | 9/2017 | Berlowitz et al. |
| 2017/0341942 A1 | 11/2017 | Harper, Jr. |
| 2018/0104668 A1 | 4/2018 | Tan et al. |
| 2020/0009494 A1 | 1/2020 | Ritter et al. |
| 2020/0027096 A1* | 1/2020 | Cooner ................. G06Q 40/04 |
| 2020/0148038 A1 | 5/2020 | Kujak et al. |
| 2020/0340665 A1* | 10/2020 | Fuglevand ........... B01D 53/047 |
| 2021/0048835 A1 | 2/2021 | Brown |
| 2021/0116144 A1* | 4/2021 | Morgan .................... F24F 11/59 |
| 2021/0325064 A1 | 10/2021 | Amhamed et al. |
| 2022/0011731 A1 | 1/2022 | Risbeck et al. |
| 2022/0358515 A1* | 11/2022 | Kahn ...................... G06F 30/27 |
| 2022/0390137 A1* | 12/2022 | Wenzel ................ G06Q 10/063 |
| 2023/0125924 A1 | 4/2023 | Nawaz et al. |
| 2023/0175686 A1 | 6/2023 | Fuglevand et al. |
| 2023/0201757 A1 | 6/2023 | Alissa et al. |

FOREIGN PATENT DOCUMENTS

| | | |
|---|---|---|
| CA | 2559081 | 12/2012 |
| CA | 3022534 | 2/2017 |
| CN | 106025313 | 10/2016 |
| CN | 107355680 | 11/2017 |
| DK | 2615264 | 8/2016 |
| EP | 2950911 | 12/2015 |
| JP | H0699034 | 4/1994 |
| JP | 2000-317302 A | 11/2000 |
| JP | 2011-247533 | 12/2011 |
| KR | 10-1038439 | 6/2011 |
| KR | 2013-0047109 | 5/2013 |
| WO | WO 02/09849 | 2/2002 |
| WO | WO 2009/070785 | 6/2009 |
| WO | WO 2010/068924 | 6/2010 |
| WO | WO 2010/139903 | 12/2010 |
| WO | WO 2014/127913 | 8/2014 |
| WO | WO 2014/207035 | 12/2014 |
| WO | WO 2016/205303 | 12/2016 |
| WO | WO 2017/003715 | 1/2017 |
| WO | WO 2017/116307 | 7/2017 |
| WO | WO 2017/163549 | 9/2017 |
| WO | WO 2017/189238 | 11/2017 |
| WO | WO 2020/219907 | 10/2020 |
| WO | WO 2021/096958 | 5/2021 |
| WO | WO 2021/156457 | 8/2021 |
| WO | WO 2022/087265 | 4/2022 |
| WO | WO 2022/094124 | 5/2022 |
| WO | WO 2022/212719 | 10/2022 |
| WO | WO 2022/266377 | 12/2022 |
| WO | WO 2023/212246 | 11/2023 |

OTHER PUBLICATIONS

WO PCT/US2020/030533 Search Rprt., Sep. 11, 2020, Carbonquest, Inc.

WO PCT/US2020/030533 Writ. Opin., Sep. 11, 2020, Carbonquest, Inc.

WO PCT/US2021/057111 Search Rprt, Mar. 1, 2022, Carbonquest, Inc.

WO PCT/US2021/057111 Writ. Opin., Mar. 1, 2022, Carbonquest, Inc.

WO PCT/WO2022/022853 Inv. Pay Fee, May 24, 2022, Carbonquest, Inc.

WO PCT/US2022/022853 Search Rprt., Jul. 29, 2022, Carbonquest, Inc.

WO PCT/US2022/022853 Writ Opin., Jul. 29, 2022, Carbonquest, Inc.

WO PCT/US2022/033871 Inv. Pay Fee, Sep. 9, 2022, Carbonquest, Inc.

ASCO, "CO2 Production Plants", available online at https://www.ascoco2.com/fileadmin/PDF_Download/PDF_Produkte/PDF_CO2_Produktion_und_Rueckgewinnung/en/ASCO_CO2_Production_Plants.pdf, Oct. 2017, 4 pages.

ASCO, "CO2 Stack Gas Recovery Systems", available online at https://www.ascoco2.com/fileadmin/PDF_Download/PDF_Produkte/PDF_CO2_Produktion_und_Rueckgewinnung/en/ASCO_CO2_Stack_Gas_Recovery_Systems.pdf, Aug. 2018, 4 pages.

ASCO, "CO2 Storage and Transport", available online at https://www.ascoco2.com/en/co2-and-dry-ice-equipment/co2-storage/, Mar. 12, 2019, 5 pages.

ASCO, "CO2: Industrial Gases", available online at https://www.ascoco2.com/en/co2-production-and-co2-recovery-plants/industries/industrial-gases/, Mar. 12, 2019, 4 pages.

Fluor, "Carbon Capture Recovery Technologies for Flue Gas Streams Reduce Greenhouse Gas Emissions", available online at https://www.fluor.com/client-markets/energy-chemicals/carbon-capture, Mar. 12, 2019, 2 pages.

Fluor, "Econamine FG Plus", available online at https://www.fluor.com/about-fluor/corporate-information/technologies/fluor-econamine-fg-plus, Mar. 12, 2019, 2 pages.

Global CCS Institute, "Liquid CO2 Collection Network", available online at https://hub.globalccsinstitute.com/publications/co2-liquid-logistics-shipping-concept-llsc-overall-supply-chain-optimization/52-liquid, Mar. 14, 2019, 4 pages.

Poola et al., "Study of Using Oxygen-Enriched Combustion Air for Locomotive Diesel Engines", CONF-961017-7, available online at https://digital.library.unt.edu/ark:/67531/metadc674816/m2/1/high_res_d/392758.pdf, 1996, 13 pages.

Qnergy, "Power Conversion Kit: PCK80", available online at https://www.qnergy.com/wp-content/uploads/2017/12/Download-the-PCK80-Brochure-Spec-Sheet.pdf, 2017, 2 pages.

(56) References Cited

OTHER PUBLICATIONS

Rinprasertmeechai et al., "Carbon Dioxide Removal from Flue Gas Using Amine-Based Hybrid Solvent Absorption", International Journal of Chemical and Molecular Engineering vol. 6, No. 4, 2012, United States, pp. 284-288.
WO PCT/US2023/011863 IPRP, Aug. 15, 2024, Carbonquest, Inc.
WO PCT/US2024/025729 Search Rpt, Aug. 27, 2024, Carbonquest, Inc.
WO PCT/US2024/025729 Writ.Opin., Aug. 27, 2024, Carbonquest, Inc.
WO PCT/US2024/037666 Inv Pay Fees, Sep. 3, 2024, Carbonquest, Inc.
WO PCT/US2022/022853 IPRP, Oct. 12, 2023, Carbonquest, Inc.
WO PCT/US22/033871 Search Rpt., Nov. 7, 2022, Carbonquest, Inc.
WO PCT/US22/033871 Written Op., Nov. 7, 2022, Carbonquest, Inc.
WO PCT/US2024/027659 Search Rpt, Sep. 11, 2024, Carbonquest, Inc.
WO PCT/US2024/027659 Wrt. Opin., Sep. 11, 2024, Carbonquest, Inc.
WO PCT/US2023/020278 IPRP, Nov. 7, 2024, Carbonquest, Inc.
WO PCT/US2024/037666 Search Rpt., Sep. 11, 2024, Carbonquest, Inc.
WO PCT/US2024/037666 Writ. Opin., Oct. 24, 2024, Carbonquest, Inc.
EP 20798450 Supp. Search Rept., May 17, 2023, Carbonquest, Inc.
WO PCT/US2021/057111 IPRP, May 11, 2023, Carbonquest, Inc.
WO PCT/US2023/011863 Srch. Rept., Apr. 14, 2023, Carbonquest, Inc.
WO PCT/US2023/011863 Writ. Opin., Apr. 14, 2023, Carbonquest, Inc.
WO PCT/US2023/018080 Inv.PayFees, Jun. 2, 2023, Carbonquest, Inc.
WO PCT/US2023/018080 Search Rpt, Aug. 15, 2023, Carbonquest, Inc.
WO PCT/US2023/018080 Writ. Opin. Aug. 15, 2023, Carbonquest, Inc.
WO PCT/US2023/020278 Search Rpt, Jul. 21, 2023, Carbonquest, Inc.
WO PCT/US2023/020278 Written Opin, Jul. 21, 2023, Carbonquest, Inc.
WO PCT/US2022/033871 IPRP, Dec. 28, 2023, Carbonquest, Inc.
WO PCT/US2024/027659 Inv Pay Fees, Jul. 1, 2024, Carbonquest, Inc.
EP EP 21887548 Extend. Srch.Rpt, Jan. 8, 2025, Carbonquest, Inc.
WO PCT/US24/056728 Invit. Pay Fee, Jan. 3, 2025, Carbonquest, Inc.
WO PCT/US24/056728 Search Rept., Feb. 25, 2025, Carbonquest, Inc.
WO PCT/US24/056728 Writ. Opin., Feb. 25, 2025, Carbonquest, Inc.
Qazvini et al., "MUF-16: A Robust Metal-Organic Framework for Pre- and Post-Combustion Carbon Dioxide Capture", ACS Applied Materials & Interfaces, vol. 13, Mar. 4, 2021, pp. 12141-12148.

* cited by examiner

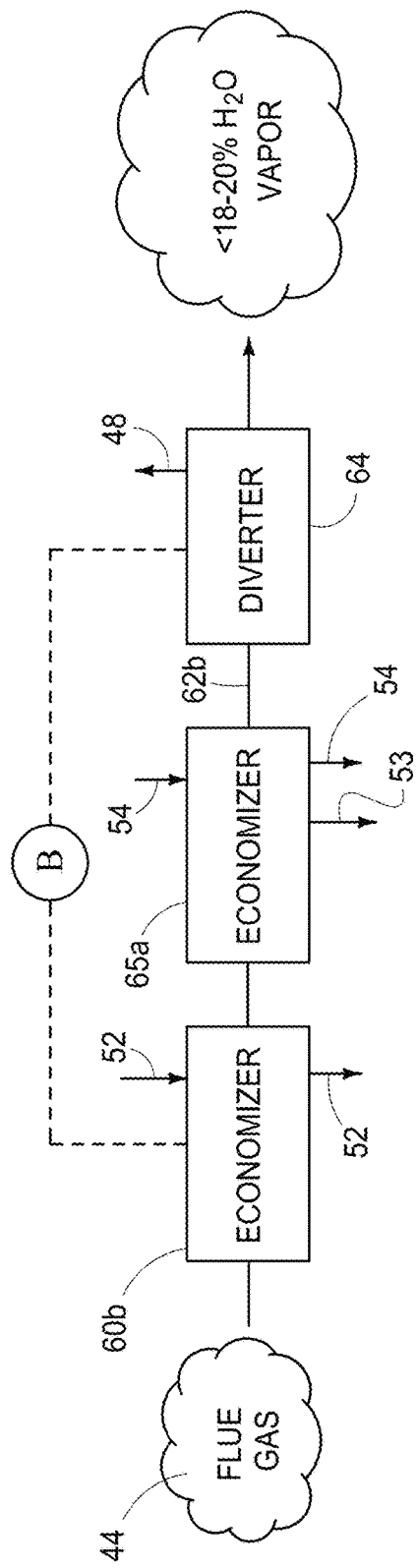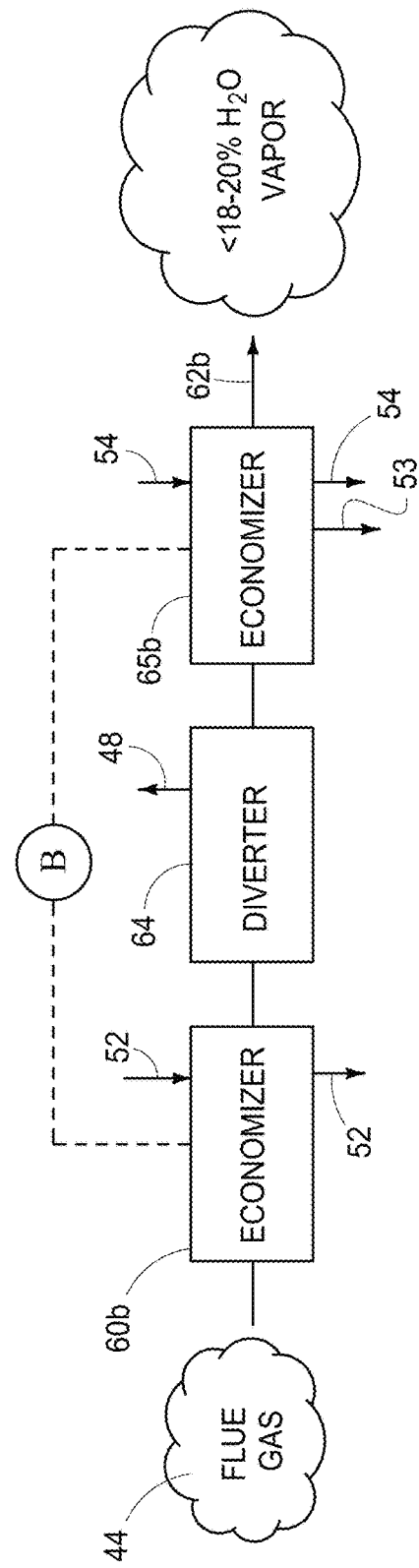

| | Building | LL 97: Gross Carbon Captured ($) | LL97: Cost to Capture ($) | LL 97: Net Carbon Captured ($) | CO2 Sales ($) | Total CC revenue (LL97+CO2 sales) ($) |
|---|---|---|---|---|---|---|
| 1. | Bristol | 461764 | 85,492 | 376,272 | 516,900 | 893,172 |
| 2. | Fairmont | 384580 | 85,492 | 299,088 | 430,500 | 729,588 |
| 3. | Paramount | 357780 | 85,492 | 272,288 | 400,500 | 672,788 |
| 4. | Grand Tier | 183312 | 59,228 | 124,084 | 205,200 | 329,284 |

FIG. 20

CARBON MANAGEMENT SYSTEMS AND METHOD FOR MANAGEMENT OF CARBON USE AND/OR PRODUCTION IN BUILDINGS

CROSS REFERENCE TO RELATED APPLICATION

This application claims priority to and the benefit of U.S. Provisional Patent Application Ser. No. 63/254,432 filed Oct. 11, 2021, entitled "Carbon Management System and Methods", the entirety of which is hereby incorporated by reference. This application is related to U.S. patent application Ser. No. 16/862,006 filed Apr. 29, 2020, entitled "Building Emission Processing and/or Sequestration Systems and Methods" which was published on Oct. 29, 2020, as U.S. Patent Application Publication No. US 2020/0340665, which claims priority to and the benefit of U.S. Provisional Patent Application Ser. No. 62/840,206 filed Apr. 29, 2019, entitled "Building Carbon Dioxide Sequestration Systems and Methods" and U.S. Provisional Patent Application Ser. No. 62/977,050 filed Feb. 14, 2020, entitled "Building Emission Processing and/or Sequestration Systems and Methods", the entirety of each of which is incorporated by reference herein.

TECHNICAL FIELD

The present disclosure relates to the management of carbon use and/or production in buildings.

BACKGROUND

Carbon dioxide generation in buildings is a significant contributor to carbon dioxide generation overall. Carbon dioxide is currently listed as a global warming compound whose reduction is sought worldwide. The generation of carbon dioxide is a necessary part of respiration, which is a necessary part of life, but it is important to limit the generation of carbon dioxide in an effort to address climate change. Additionally, buildings consume carbon in the form of energy. The present disclosure provides carbon management systems and methods that can address carbon dioxide generation as well as storage and/or carbon consumption.

SUMMARY

Carbon management systems and carbon optimization systems are provided. The systems can include: processing circuitry operably coupled to a carbon site control module, wherein the carbon site control module is operably engaged with one or more of a carbon resource module, a carbon capture control module, and/or a building management system.

DRAWINGS

Embodiments of the disclosure are described below with reference to the following accompanying drawings.

Figure 13A:
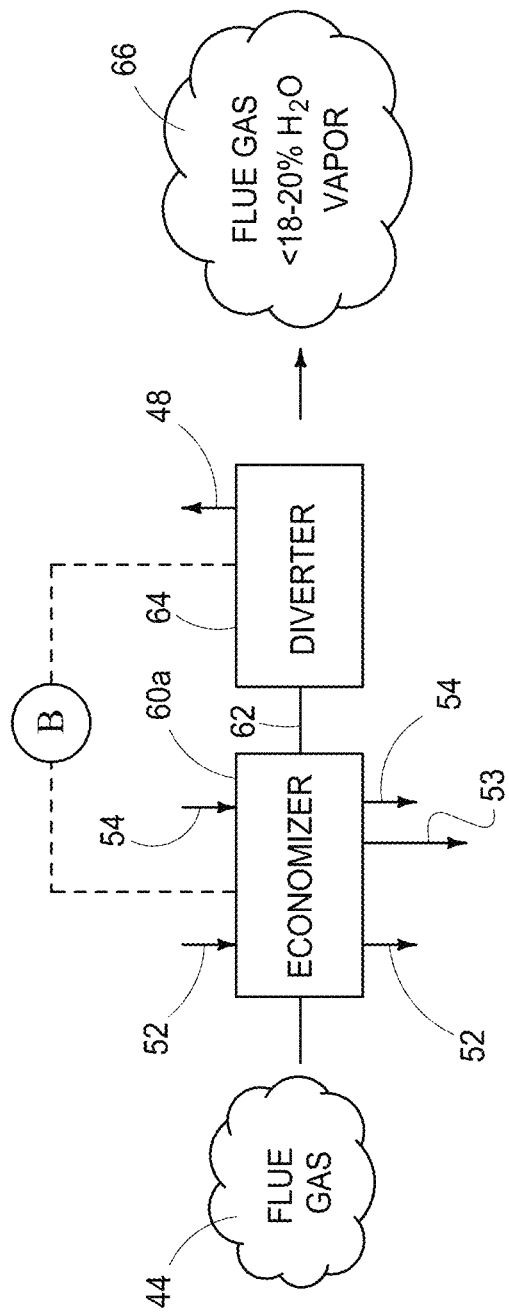

FIGS. 13A, 13B, and 13C are depictions of flue gas processing systems according to an embodiment of the disclosure.

Figure 14:
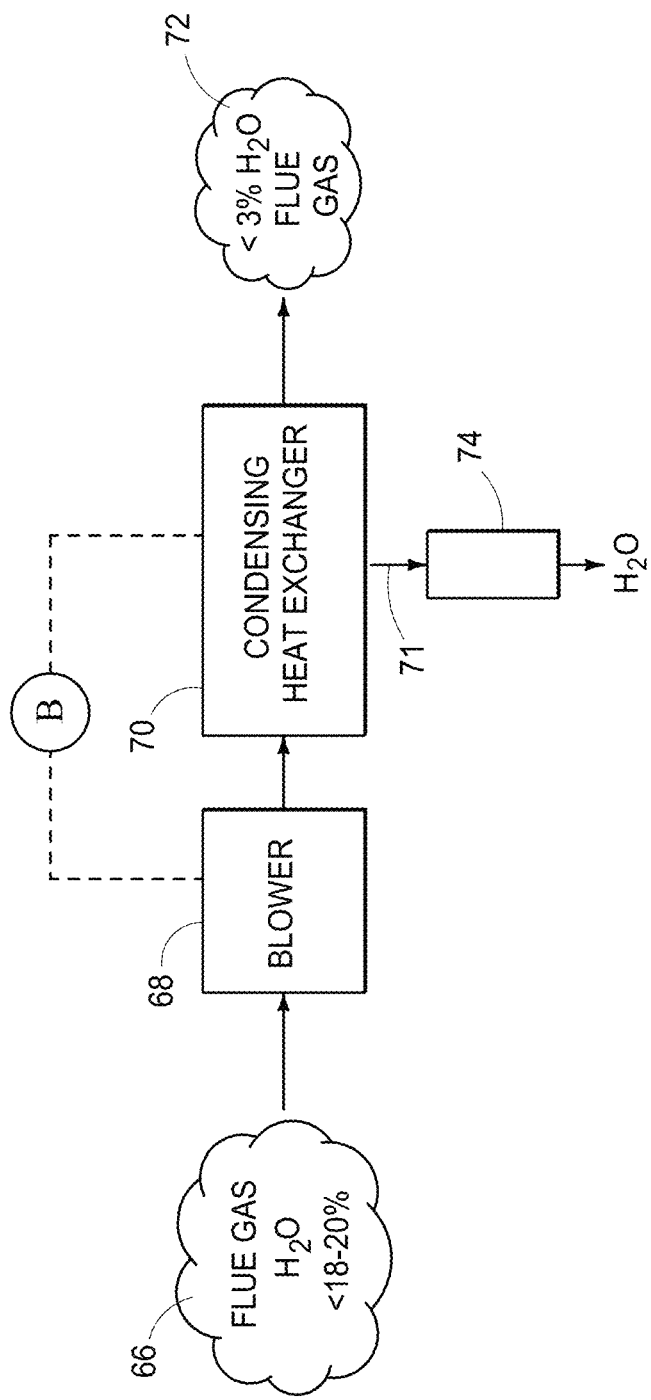

FIG. 14 is a depiction of flue gas processing systems according to an embodiment of the disclosure.

Figure 15:
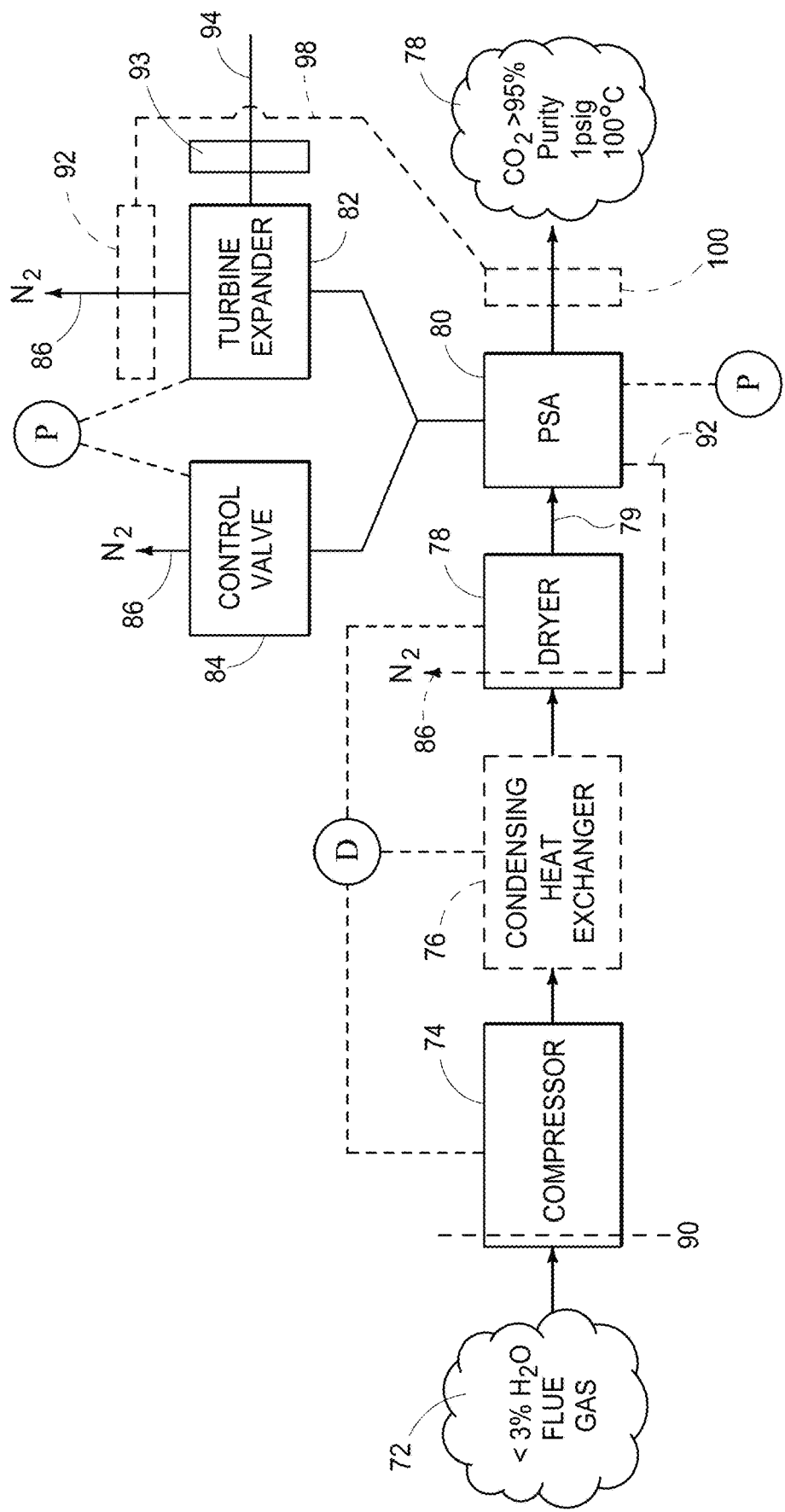

FIG. 15 is a depiction of flue gas processing systems according to an embodiment of the disclosure.

Figure 16:
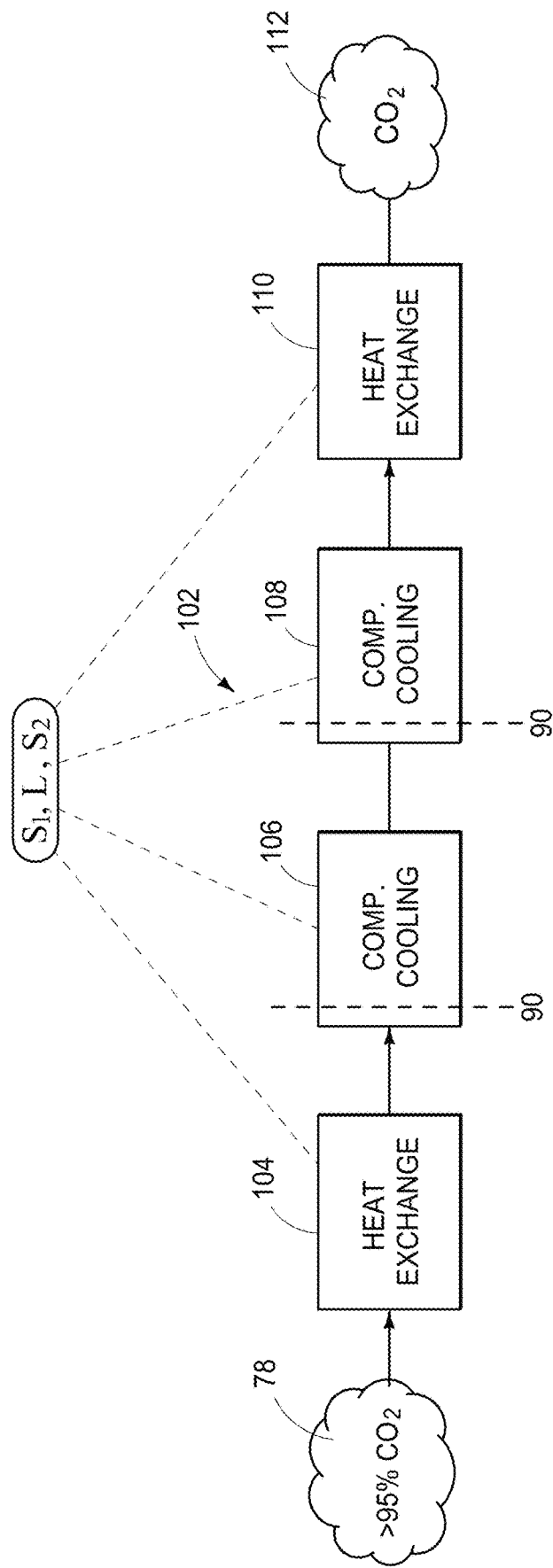

FIG. 16 is an overall depiction of flue gas processing systems according to an embodiment of the disclosure.

Figure 17:
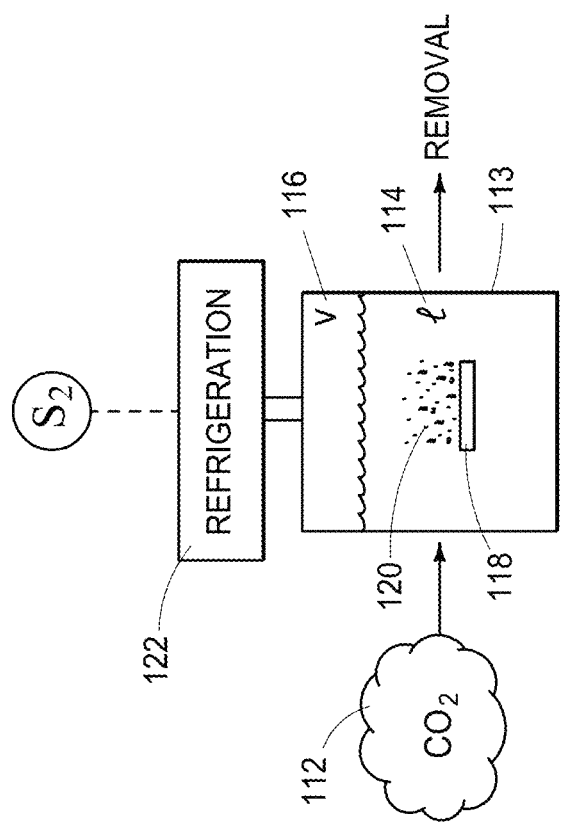
Figure 18:
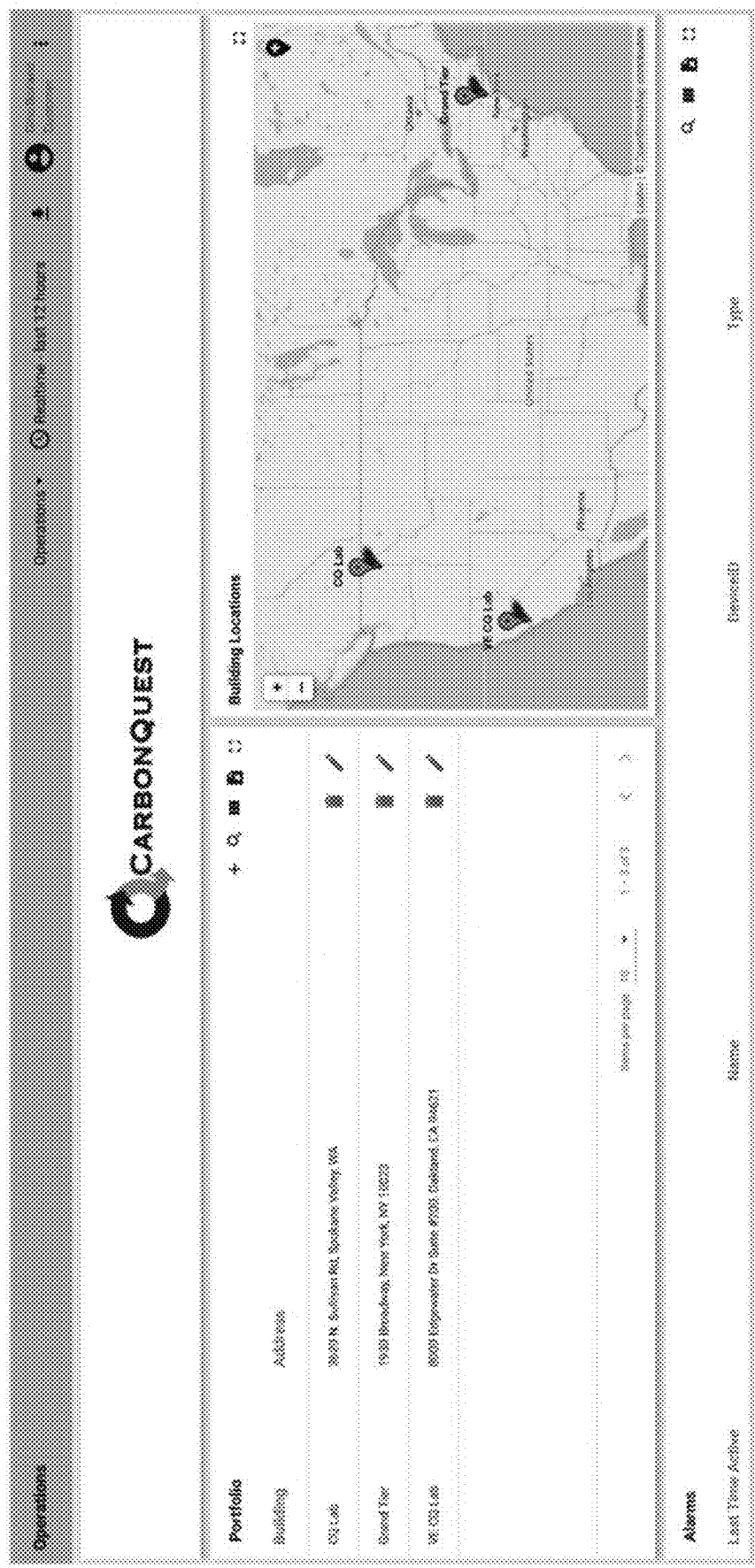

FIG. 17 is a depiction of a flue gas processing system according to an embodiment of the disclosure.

FIGS. 18-23 are depictions of interface views according to an embodiment of the disclosure.

Figure 24:
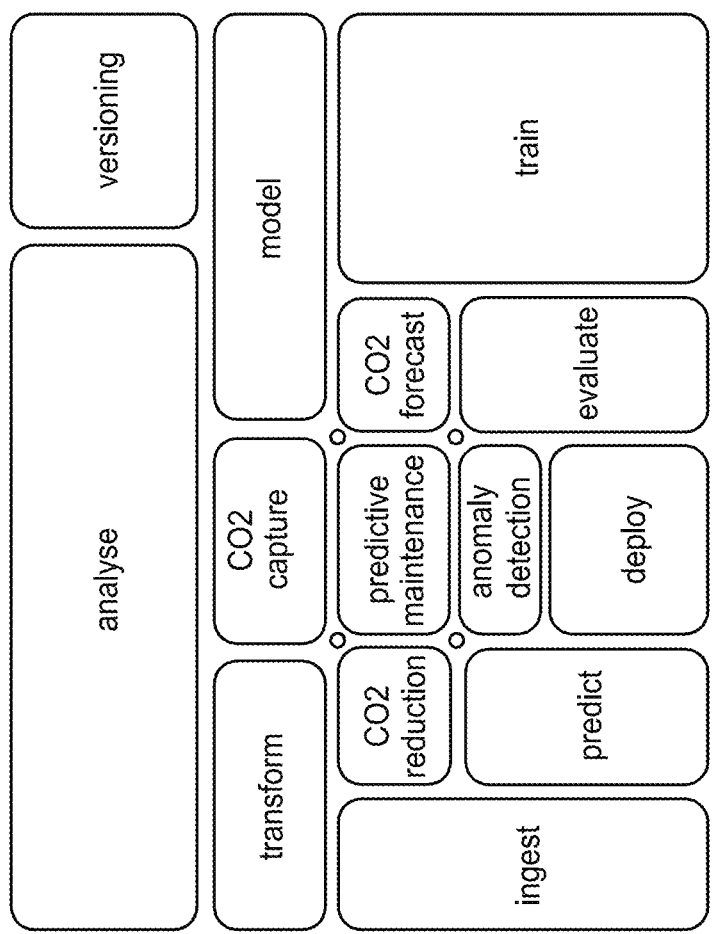

FIG. 24 is a machine learning operation configuration according to an embodiment of the disclosure.

Figure 25:
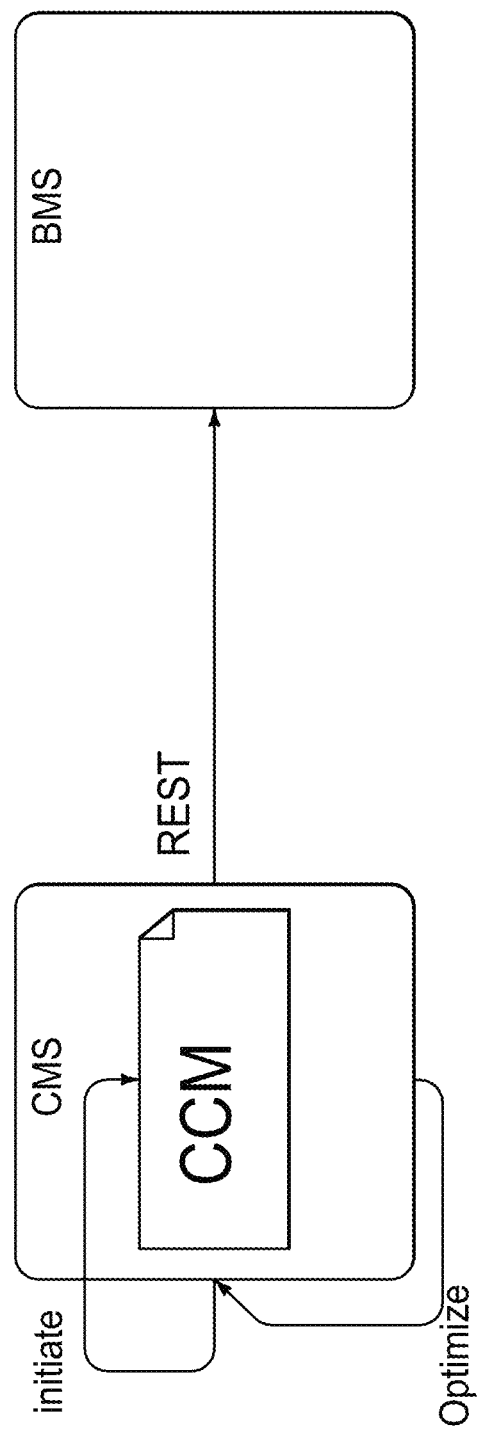

FIG. 25 is an operational flow chart of machine learning according to an embodiment of the disclosure.

Figure 26:
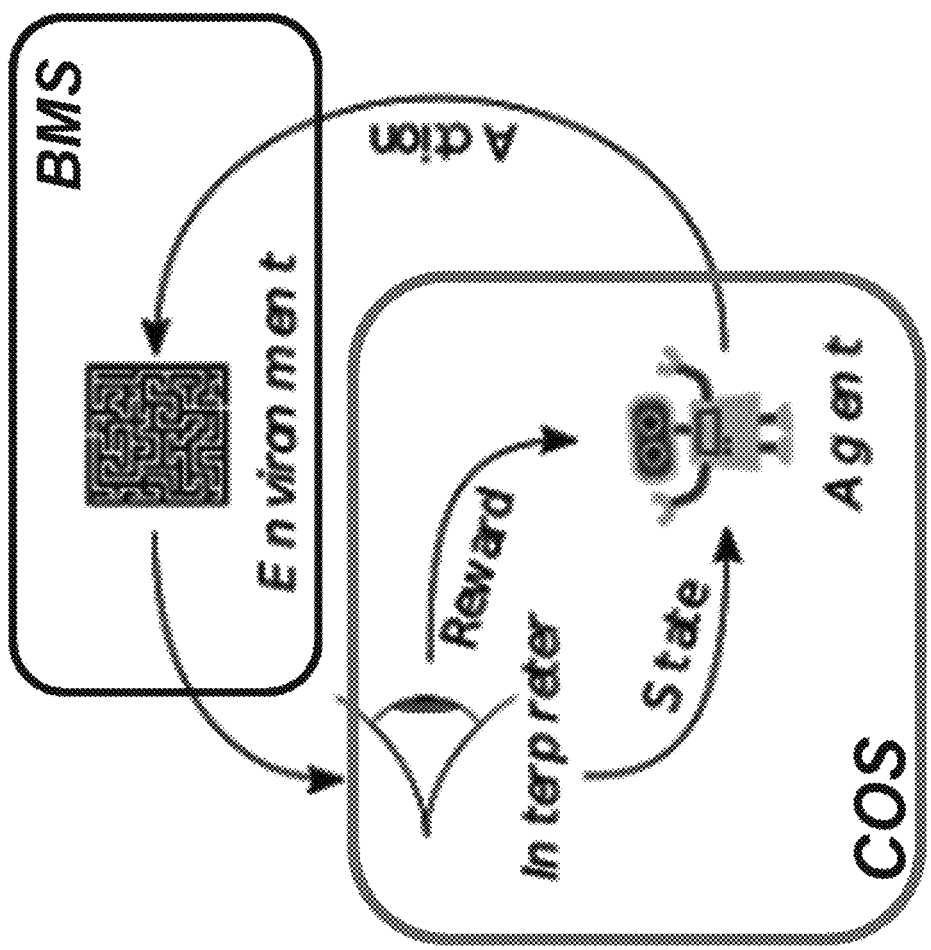

FIG. 26 is an operational machine learning system according to an embodiment of the disclosure.

Figure 27:
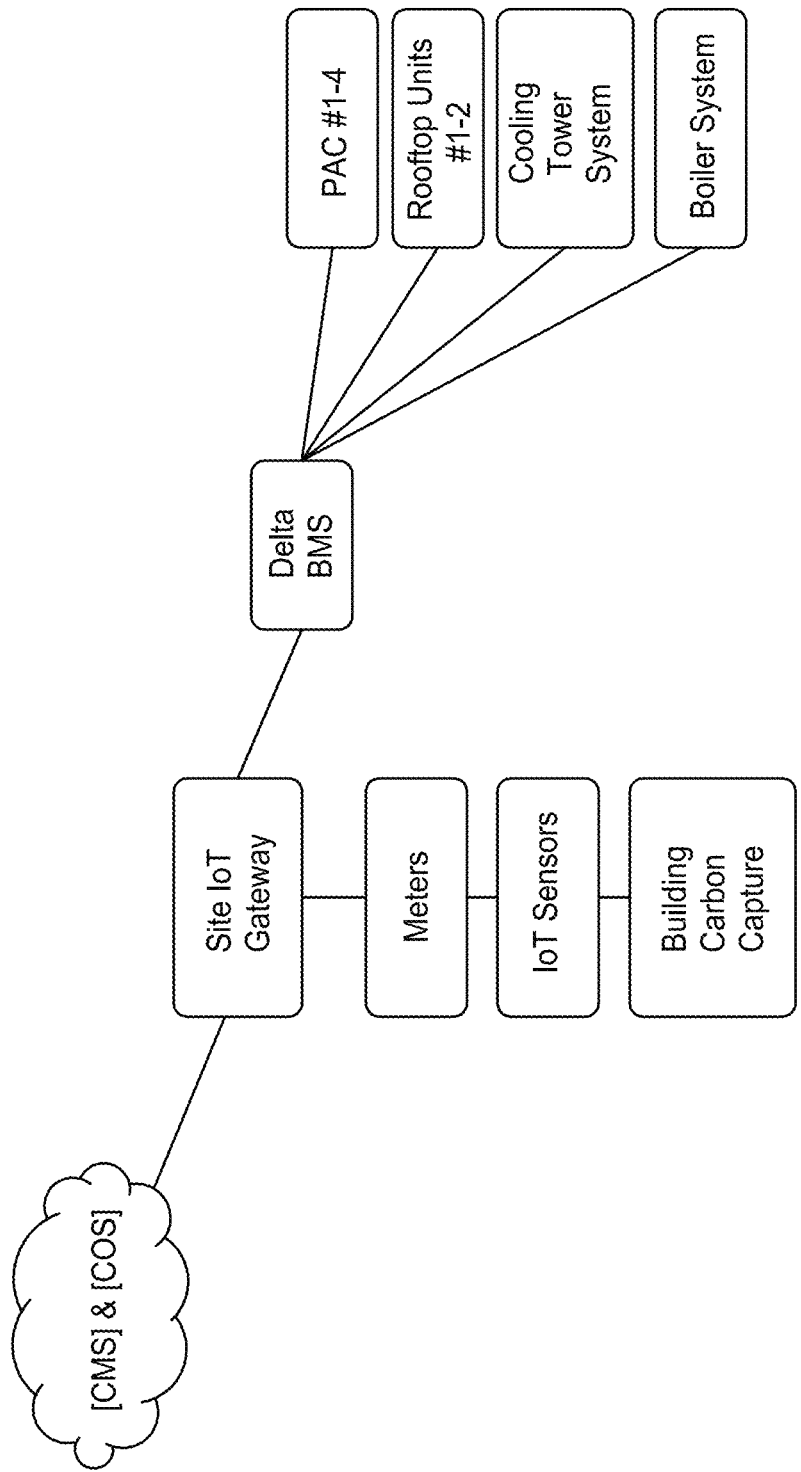

FIG. 27 is processing circuitry according to an embodiment of the disclosure.

Figure 28:
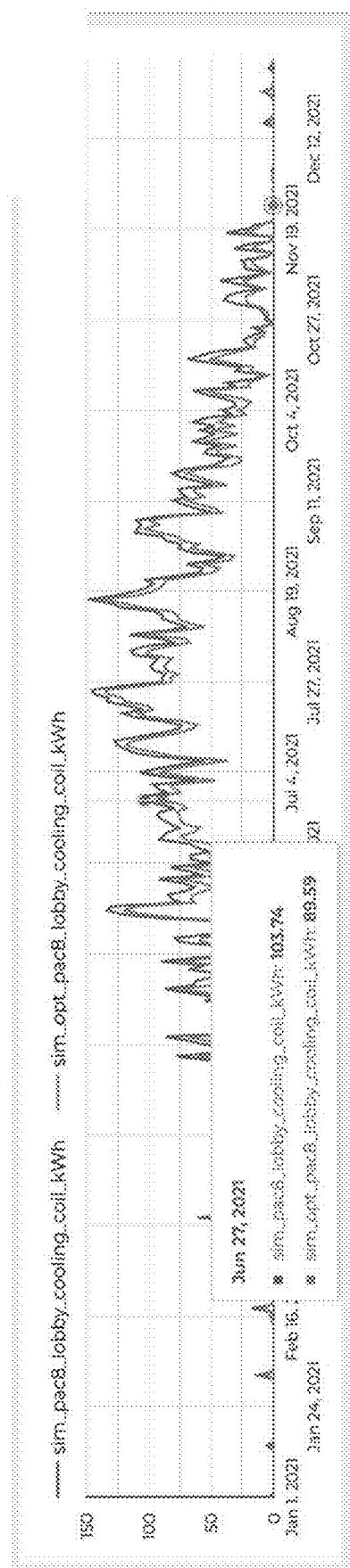
Figure 29:
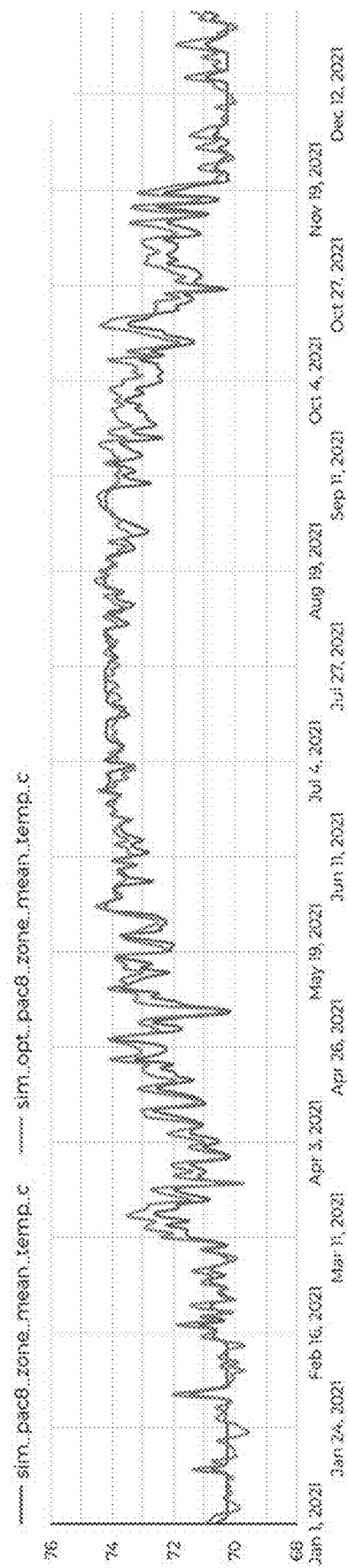

FIGS. 28 and 29 are data that can be acquired utilizing systems of the present disclosure.

Figure 30:
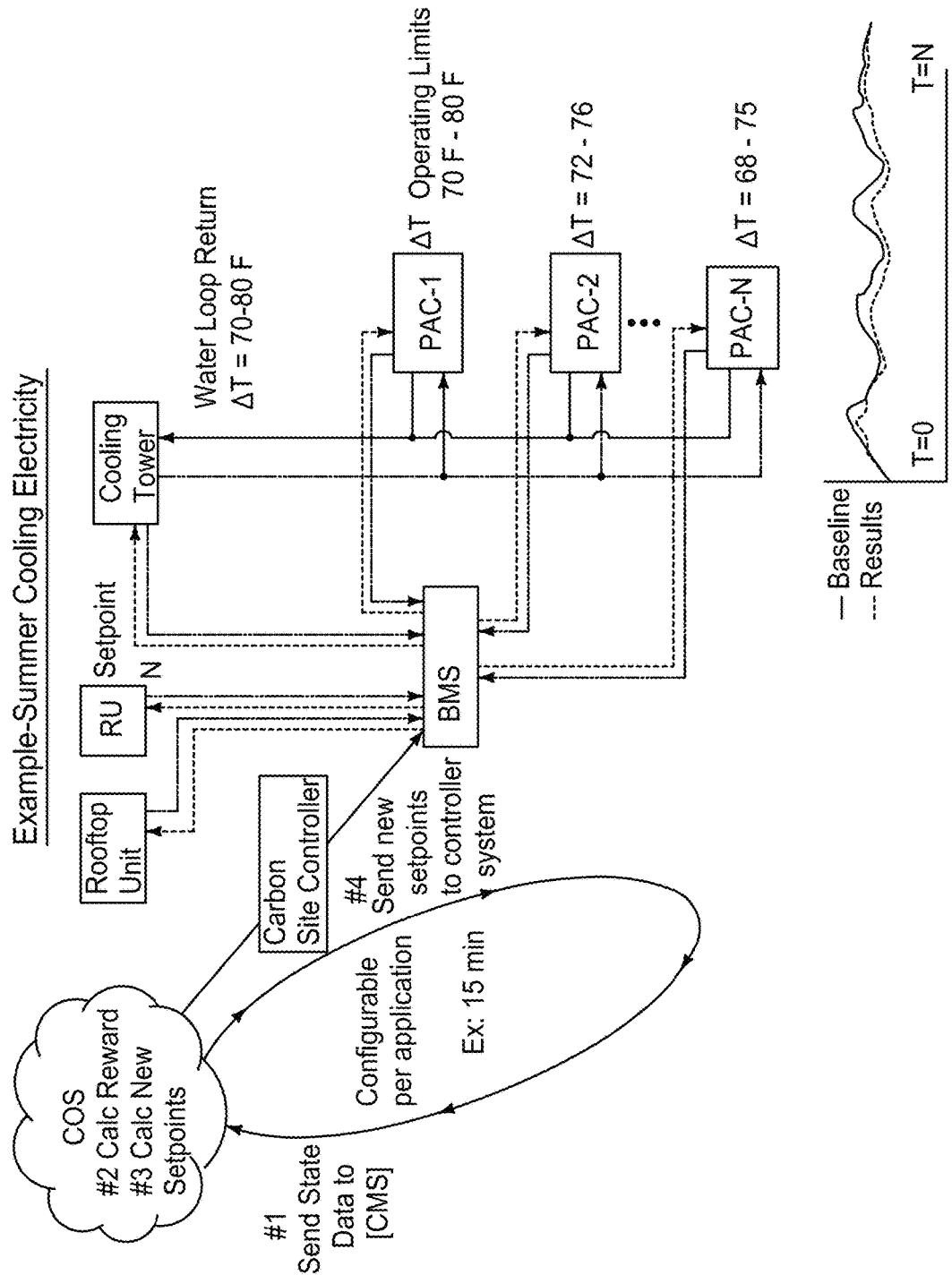

FIG. 30 is an example machine learning optimization system according to an embodiment of the disclosure.

Figure 31:
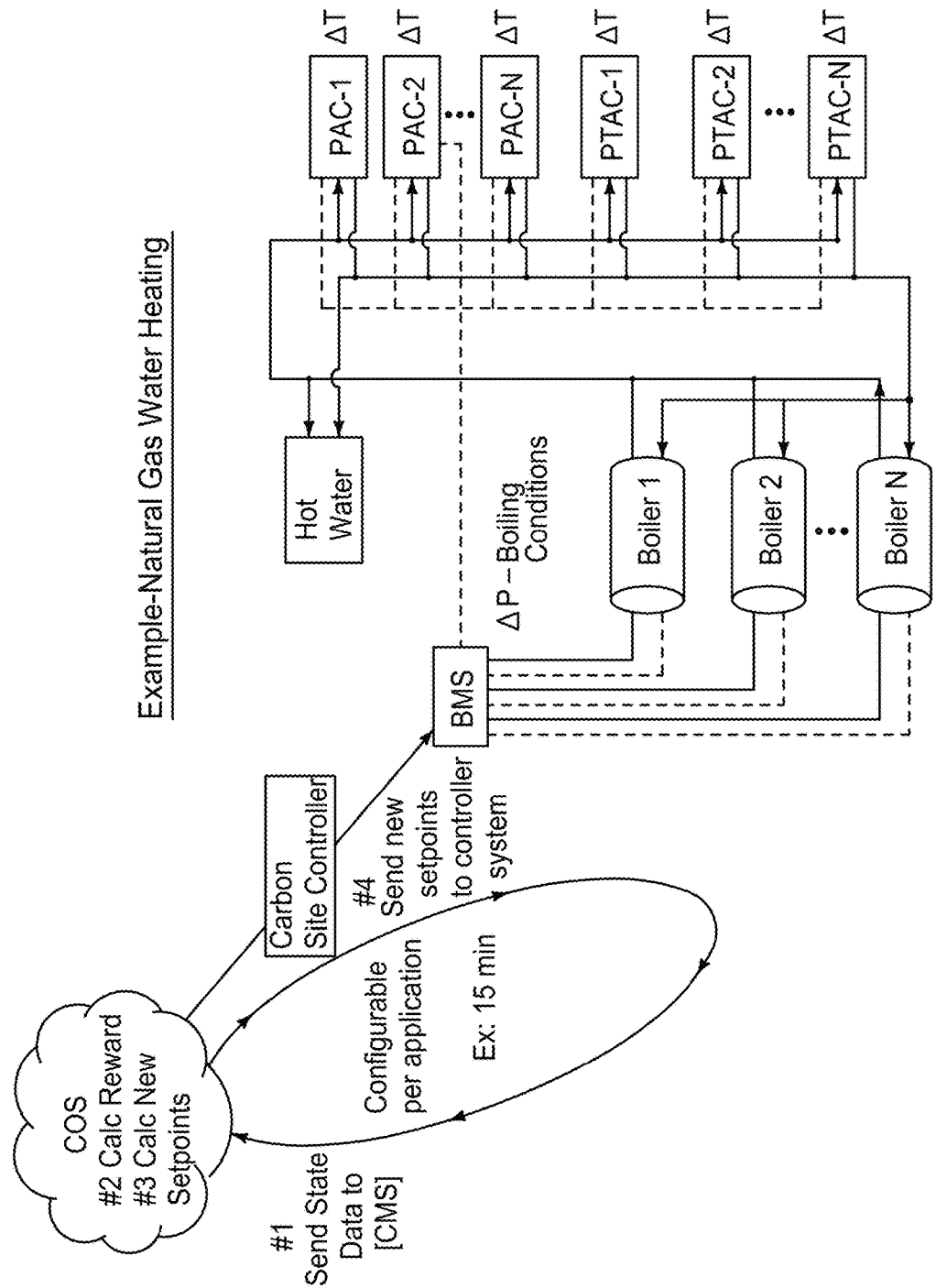

FIG. 31 is a machine learning optimization system according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
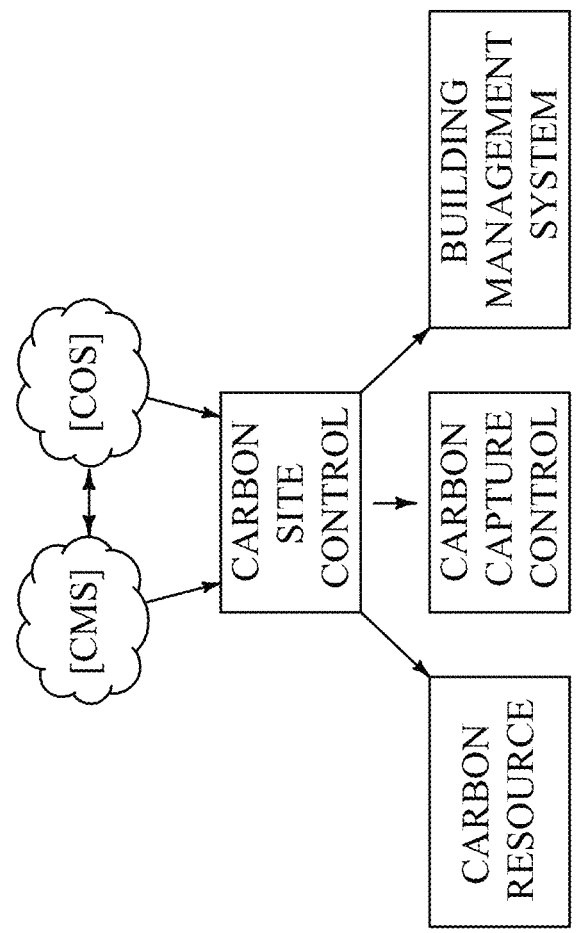
FIG. 1 is a processing circuitry system according to an embodiment of the disclosure.

The present disclosure will be described with reference to FIGS. 1-31. Referring to FIG. 1, a system is provided that includes a carbon management system (CMS) operably coupled to a carbon optimization system (COS). Both these systems are configured to work in conjunction with one another to provide carbon site control at a building management system that may also include carbon capture control and be linked to a carbon resource. These systems are designed to be used with all manner of buildings including residential, industrial, commercial, and/or buildings leaving a substantial carbon footprint upon using carbon resources such as natural gas and/or other carbon sources, up to and including electricity, which can emanate from carbon sources.

Figure 2:
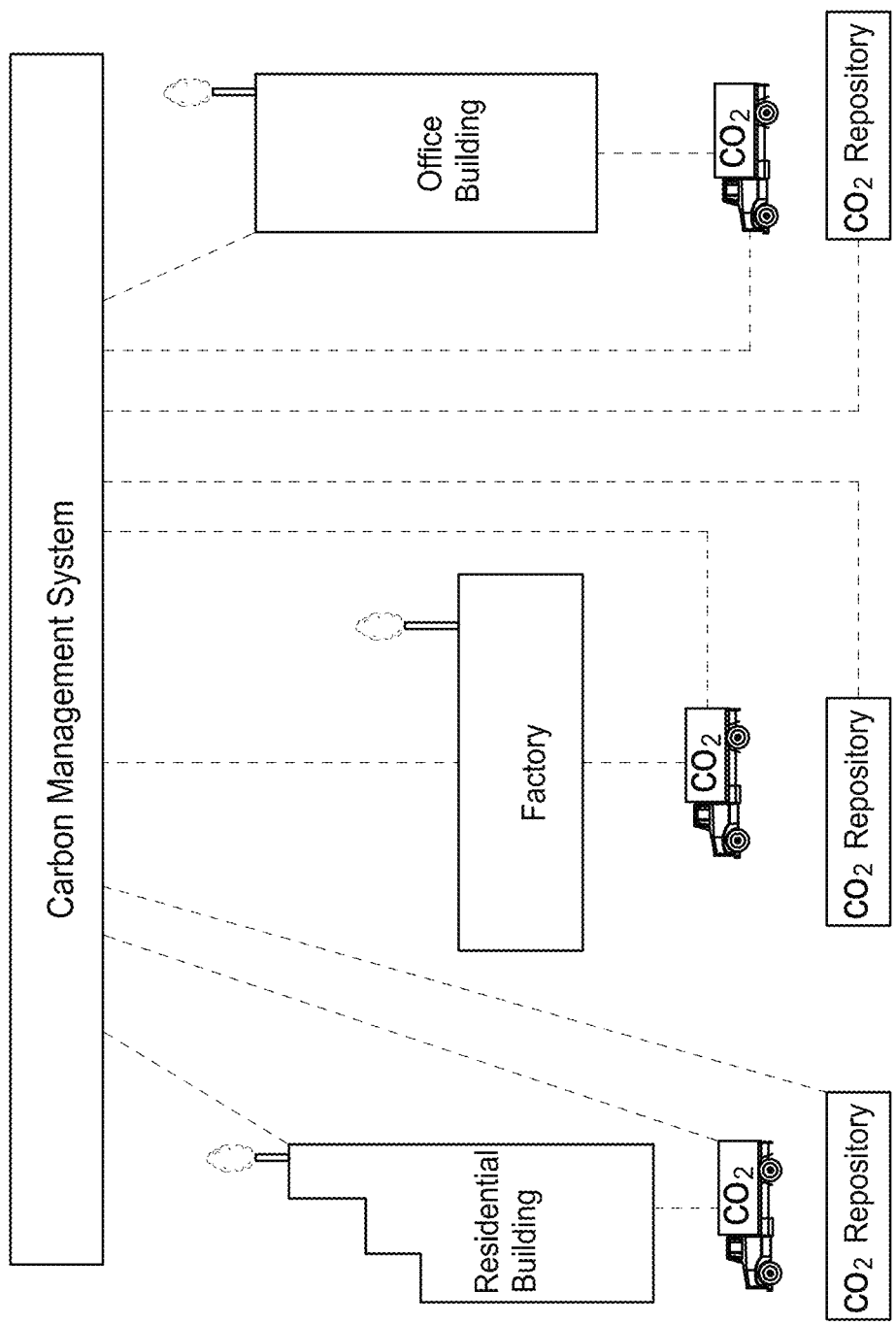
FIG. 2 is a processing circuitry system incorporated into buildings and $CO_2$ sequestration and deposit according to an embodiment of the disclosure.

Referring to FIG. 2, systems of the present disclosure can include a carbon management system which as shown can be linked via processing circuitry to residential buildings, factories, and/or office buildings, and these buildings can be configured to capture $CO_2$ upon generating combustion products. As shown, this $CO_2$ can be captured and transported to $CO_2$ repositories, all of which can be linked through the carbon management system. In accordance with example implementations, carbon management systems can be configured to dictate when the $CO_2$ is removed from residential buildings, how much $CO_2$ is removed, and where that $CO_2$ is deposited. In accordance with example implementations, for example, the carbon management system can receive data that indicates certain buildings are generating more or less $CO_2$ than other buildings and certain repositories are full or in need of $CO_2$; for example, a fluid carbonation plant may require additional $CO_2$, since the $CO_2$ leaving the factories can be food grade $CO_2$ and the carbon management system can dictate which of the $CO_2$ carriers goes to which repository.

Figure 3:
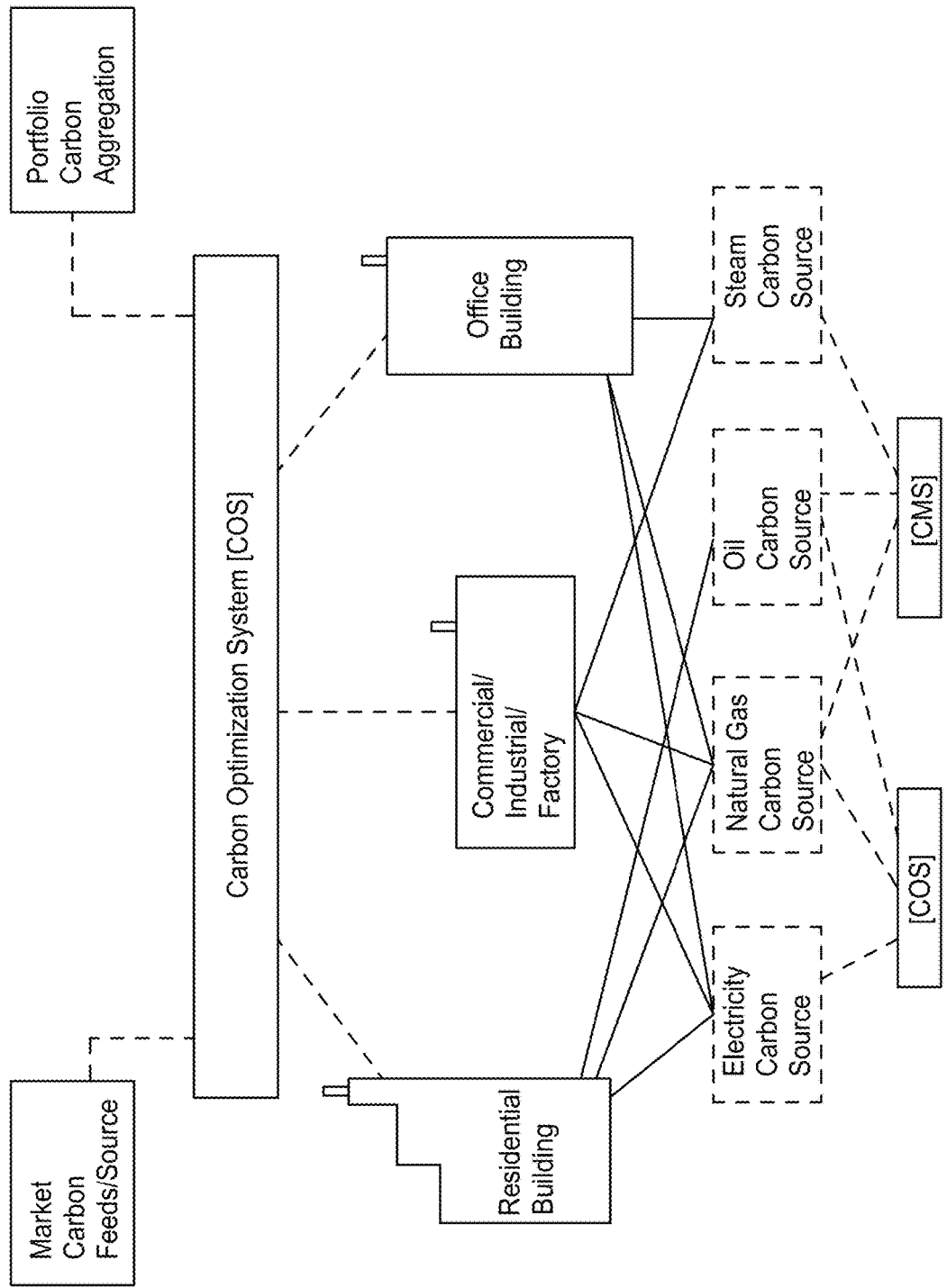
FIG. 3 is a processing circuitry system that includes carbon optimization operationally coupled with different buildings and energy resources according to an embodiment of the disclosure.

Referring to FIG. 3, carbon optimization systems can be linked as well to residential buildings, commercial industrial factories and office buildings, and these buildings themselves can be configured to receive an electric carbon source, a natural gas carbon source, an oil carbon source, or a steam carbon source, for example. As shown below, these sources can be linked to carbon optimization systems and carbon management systems, as well as the carbon optimization above being linked to portfolio carbon aggregation, for example, as well as market carbon feed sources. This data can be utilized to dictate which buildings consume which sources and at what times to most efficiently meet the building needs while conserving the amount of the carbon source utilized and produced and stored at different facilities.

Figure 4A:
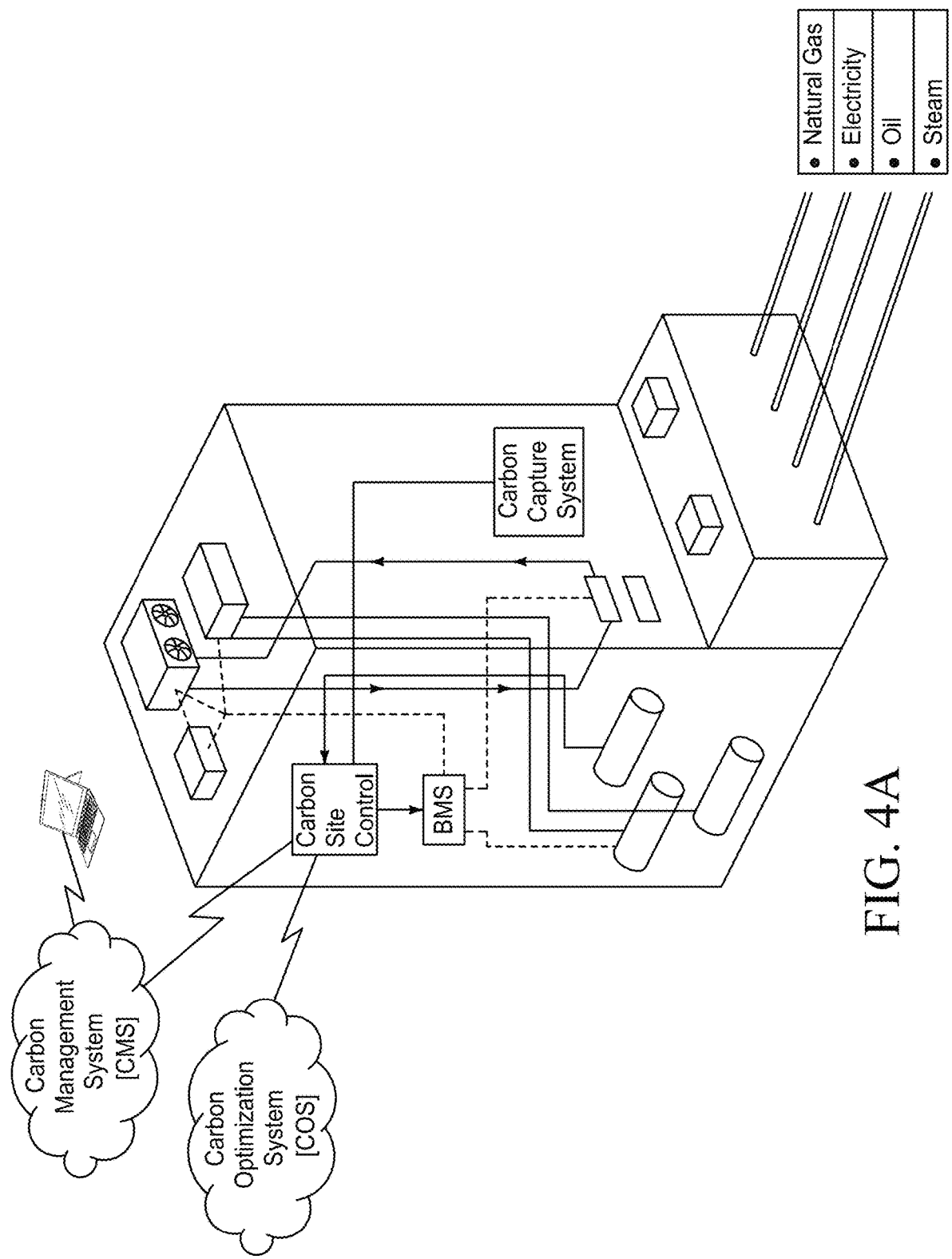
FIGS. 4A and 4B are processing circuitry integrated with building components according to an embodiment of the disclosure.

Referring to FIG. 4A, the carbon management system can be operated from an interface as shown and be operationally coupled to carbon site control as well as a building management system. Carbon optimization systems can likewise be coupled to the carbon site control and a building management system within a building. As shown, the building itself can be configured to receive natural gas, electricity, oil, and/or steam and the building may be configured to utilize the carbon capture system. Operatively, the building can have resource areas for fuel as well as air handling systems, and these flue gas handling systems and air handling systems can be operably coupled to the carbon management system and/or carbon optimization system.

Figure 4B:
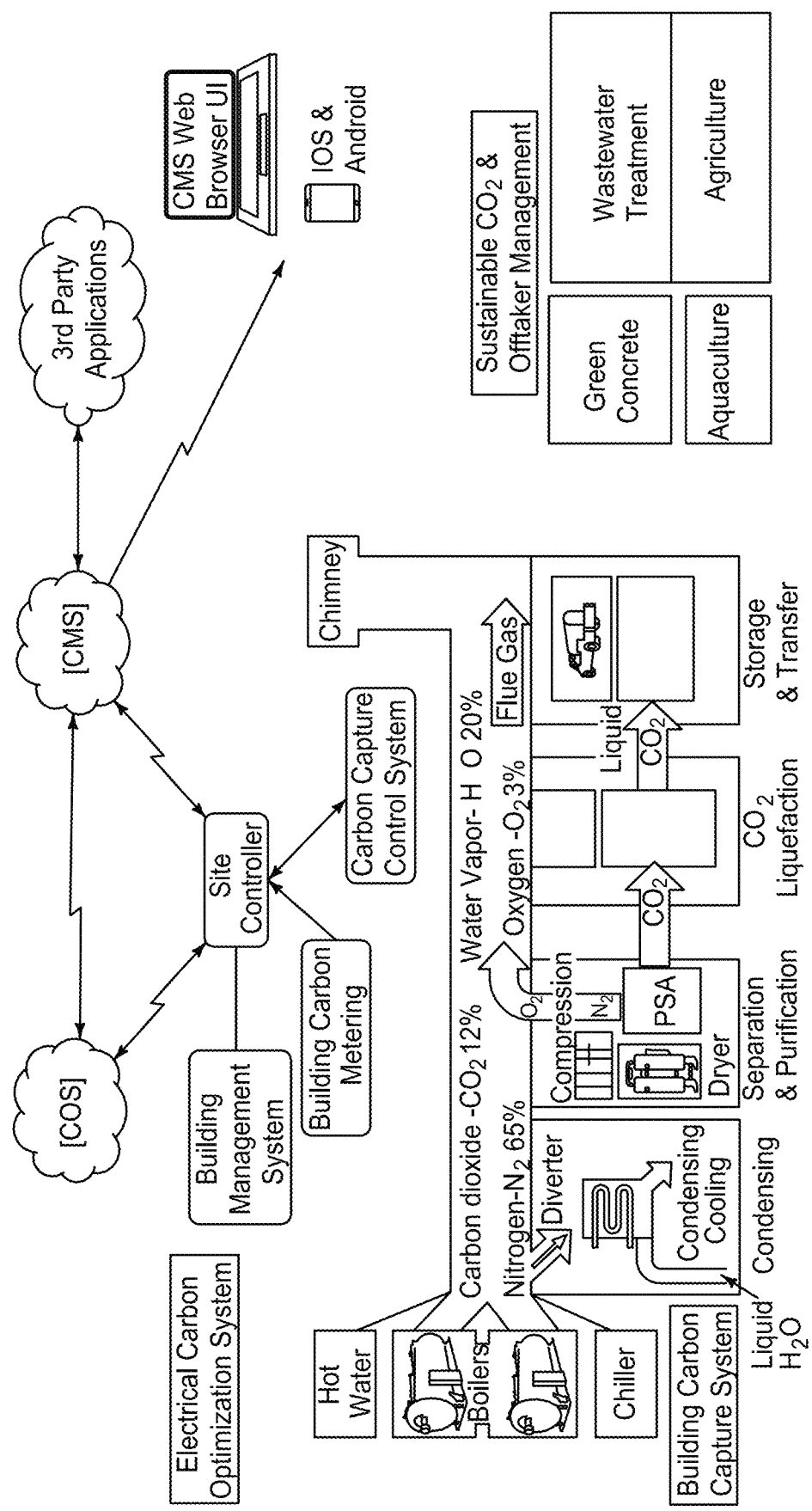

Referring next to FIG. 4B, a more detailed description of the inner workings of a building in combination with the carbon optimization and carbon management system is shown. In this implementation, the carbon management system can be coupled to third party applications, for example Carbon Trading Platforms, Weather services, and/or Carbon Market Services but the carbon management system can have an interface browser that can also be utilized as shown with an 10S, Windows or Android application. Accordingly, the carbon optimization system and carbon management system can be coupled to a site controller, which is also coupled to a building management system as well as the building carbon metering system, and the carbon capture control system as well as the electrical carbon optimization system can be coupled to the building management system. As an example implementation, the carbon capture system can include the use of hot water and a chiller and boilers as described in the referenced application and disclosed herein as well, to generate carbon dioxide at about 12%, nitrogen at about 65%; there is condensing cooling, drying, and then eventually storage and transfer. These storage and transfer can be used to Sustainable $CO_2$ offtake management such as green concrete and/or wastewater treatment, agriculture, or aquaculture technologies.

As described the systems and/or methods of the present disclosure can utilize or be part of processing circuitry. Processing circuitry can include a processor that can be part of a personal computing system that includes a computer processing unit that can include one or more microprocessors, one or more support circuits, circuits that include power supplies, clocks, input/output interfaces, circuitry, and the like. Generally, all computer processing units described herein can be of the same general type. The computing system can include a memory that can include random access memory, read only memory, removable disc memory, flash memory, and various combinations of these types of memory. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as utility providers and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

In accordance with example implementations, these processes may be utilized in connection with the processing circuitry described. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry include embedded systems such as (Raspberry PI/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

Figure 5:
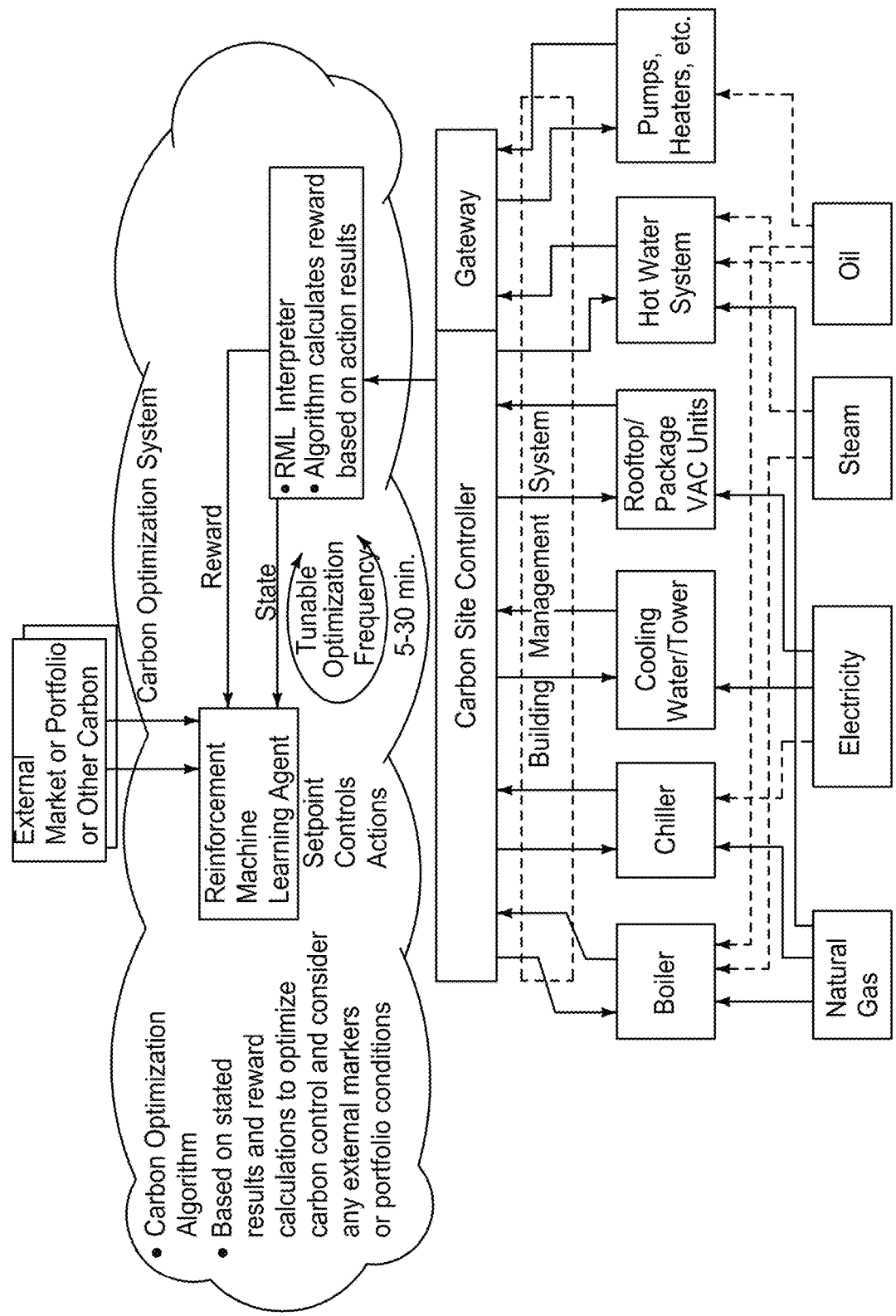
FIG. 5 is a depiction of machine learning taking place within processing circuitry coupled to building operations according to an embodiment of the disclosure.

Referring next to FIG. 5, the carbon site controller can include a gateway above a building management system. Within the carbon optimization system, multiple routines can take place, including a carbon optimization algorithm that is based on stated results and reward calculations to optimize carbon control and consider any external markers or portfolio conditions. The carbon optimization system also includes a reinforced machine learning, or RML, interpreter that is an algorithm that calculates reward based on action results. The reward can be in the form of carbon credits awarded to the building itself. As shown, the carbon site controller can be coupled to a boiler, chiller, cooling water tower, rooftop VAC units, hot water system, pumps, heaters, etc. Natural gas, electricity, steam and oil can be coupled into these systems and monitored by the carbon site controller. As a layer between the carbon site controller and these apparatus within the building can be the building management system that is typically integrated into the building itself.

Figure 6:
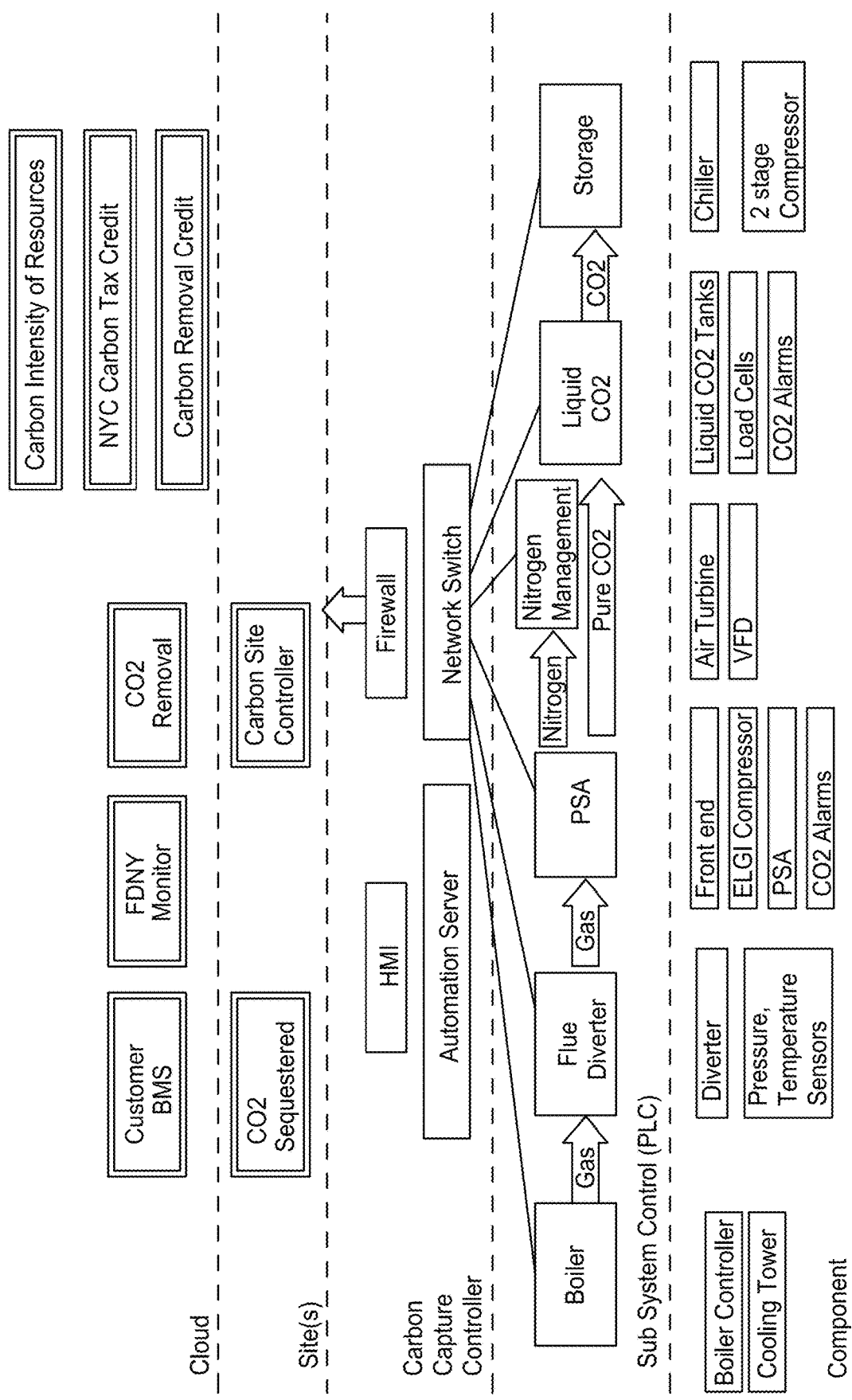
FIG. 6 is a depiction of the relation of processing circuitry systems in relation to building operational systems according to an embodiment of the disclosure.

Referring to FIG. 6, some of the rewards mentioned in FIG. 5 are shown including the carbon intensity of resources, the carbon tax credits such as the New York City carbon tax credit, and carbon removal credits. These are credits that are awarded to the building for utilizing carbon efficiently. The customer building management system can also include the New York Fire Department monitor, as well as $CO_2$ removal, and the sites themselves can also include the amount of $CO_2$ that is sequestered and the carbon site controller. Layered below that can be a carbon capture controller which can include a Human Machine Interface (HMI) or User Interface, which can be part of an automation server. There can be a firewall between the sites and the cloud and the carbon site controller. The carbon capture controller can include a network switch that allows the system to monitor and operate appliances within the system such as the boiler, flue diverter, pressure swing adsorption, nitrogen management, liquid $CO_2$ and storage. This can include the boiler controller, cooling tower component, diverter, pressure temperature sensors, front end ELGI compressor, pressure swing adsorption, $CO_2$ alarms, the air turbine, VFD, liquid $CO_2$ tanks, load cells, $CO_2$ alarms, chiller, and 2-stage compressor, for example.

Figure 7:
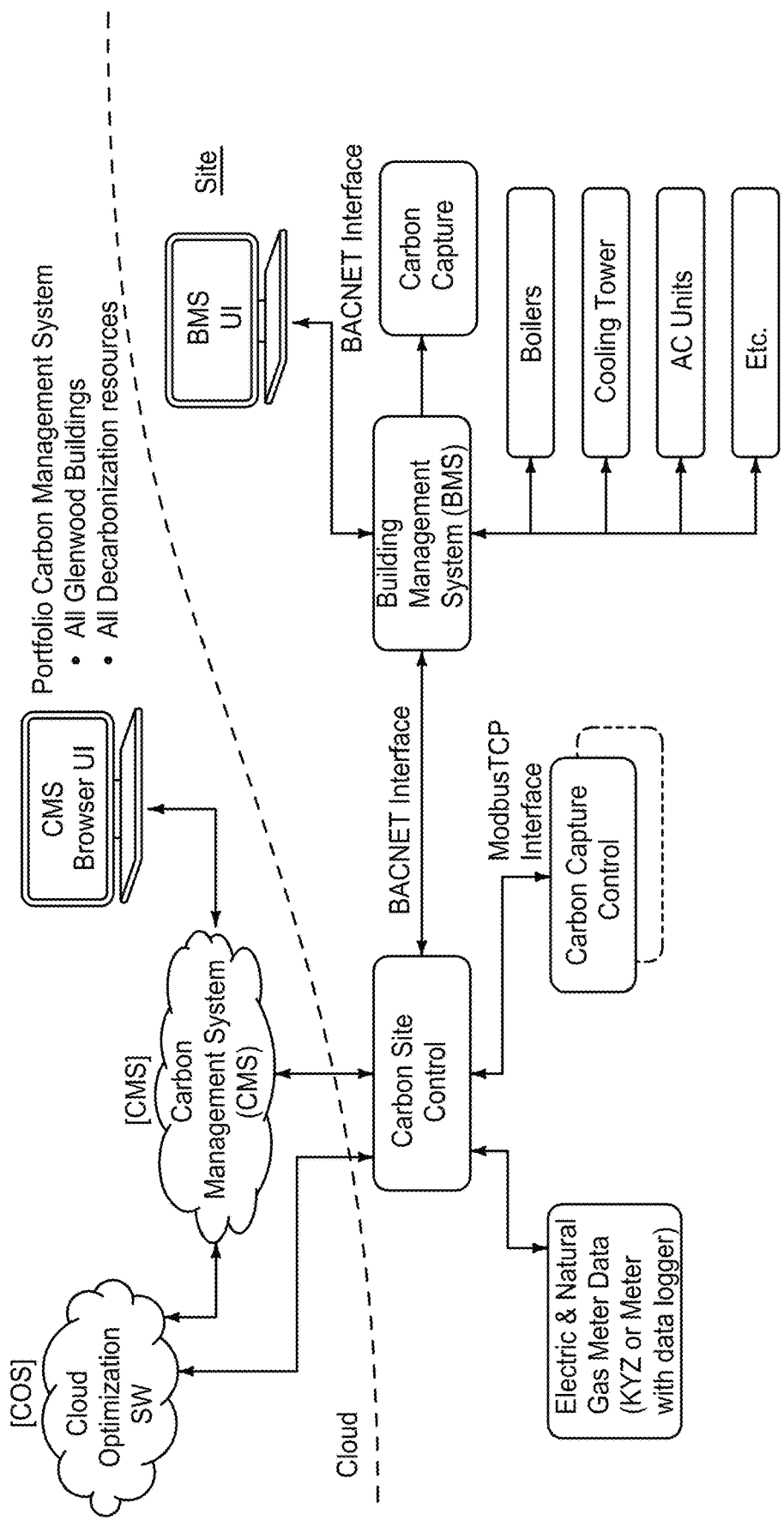
FIG. 7 is a depiction of relations of processing circuitry systems in relation to building site processing systems and building components according to embodiments of the disclosure.

Referring next to FIG. 7, another detailed view of a system according to an embodiment of the disclosure includes the cloud Carbon Optimization System (COS). The COS can include the ML algorithms while the CMS can include the comms infrastructure, data store, and/or UI server, for example. The carbon management system is coupled to the cloud optimization system as part of the carbon management system, and then you have a CMS which is coupled to a browser or interface that can include a portfolio of carbon management systems such as all Glenwood buildings, all decarbonization resources, for example. Both the COS and CMS can be coupled to the carbon site control, and the carbon site control can be coupled to a building management system via BACnet interface. The building management system can also have a site control which is firewall protected from the COS and the CMS that can control carbon capture, the boilers, the cooling towers, the AC units, etc. At carbon site control can be a carbon capture control and also electric and natural gas meter data.

Figure 8:
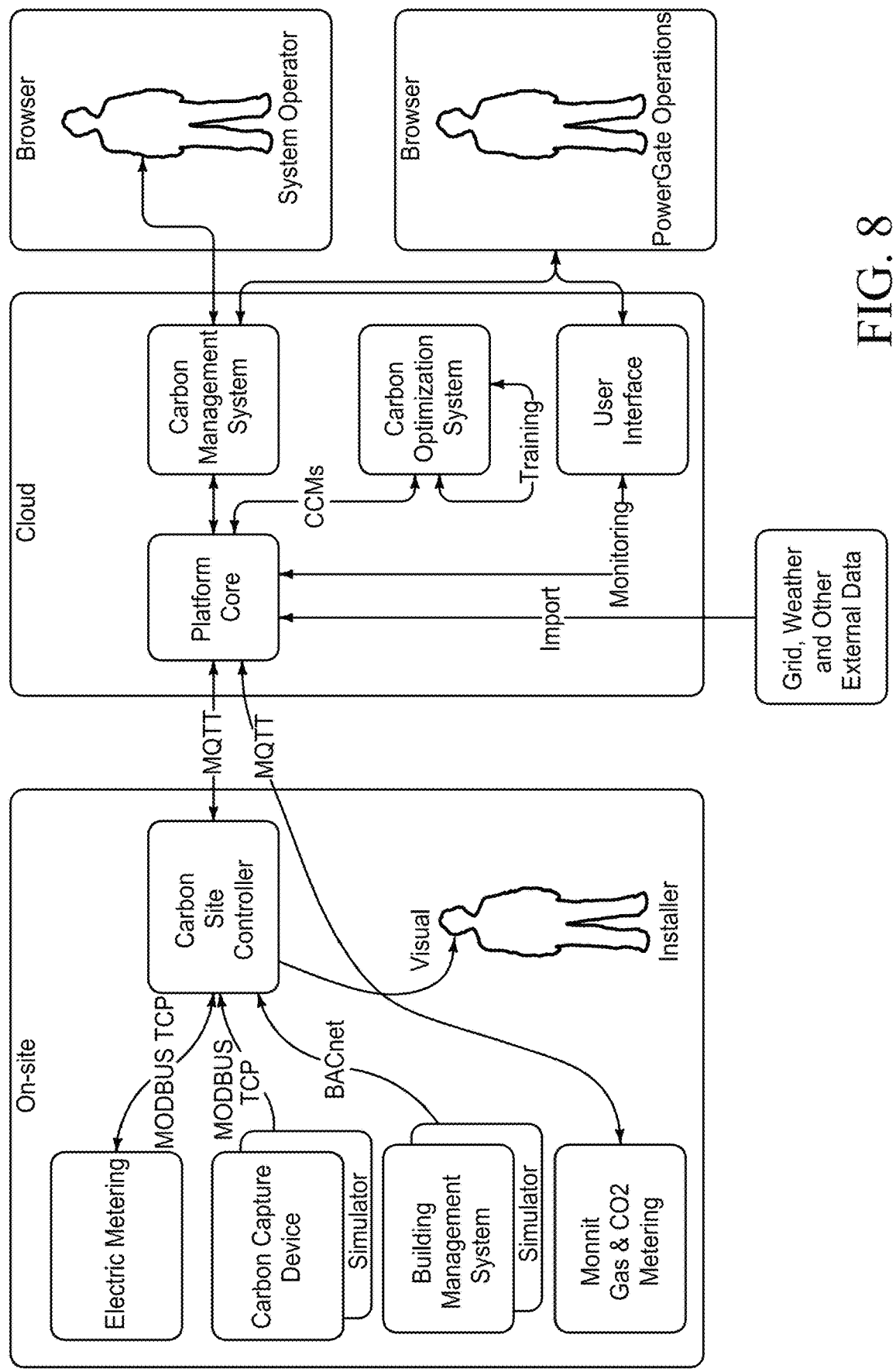
FIG. 8 is a depiction of on-site and cloud systems according to an embodiment of the disclosure.

Referring next to FIG. 8, human interfaces are shown with relation to the Platform Core operations and the system operators and the installers. On-site can be distinguished from the cloud as well as grid, weather, and other external data. On-site can be electric metering, carbon capture, building management system, and monitoring gas and $CO_2$ metering. All these can be monitored by a carbon site controller, which can be visually inspected by an installer that includes both Modbus TCPs from the electrical metering, the carbon capture device, as well as a BACnet relationship. The on-site systems can link the on-site to a cloud resource that includes the platform core as well as the carbon management system and the carbon optimization system, which undergoes training to optimize carbon usage and removal. On-site resources connect to the Cloud Platform via the Carbon Site Controller or directly via Message Queuing Telemetry Transport (MQTT). The MQTT is a standard messaging protocol for an IOT device to connect directly to remote or cloud processing circuitry. In some instances sensor devices may connect through our gateway or use MQTT (or other standard protocols) to directly connect to the CMS cloud. This can have an interface that is monitored by Platform Core operations via a browser as well as a system operator via a browser.

Figure 9:
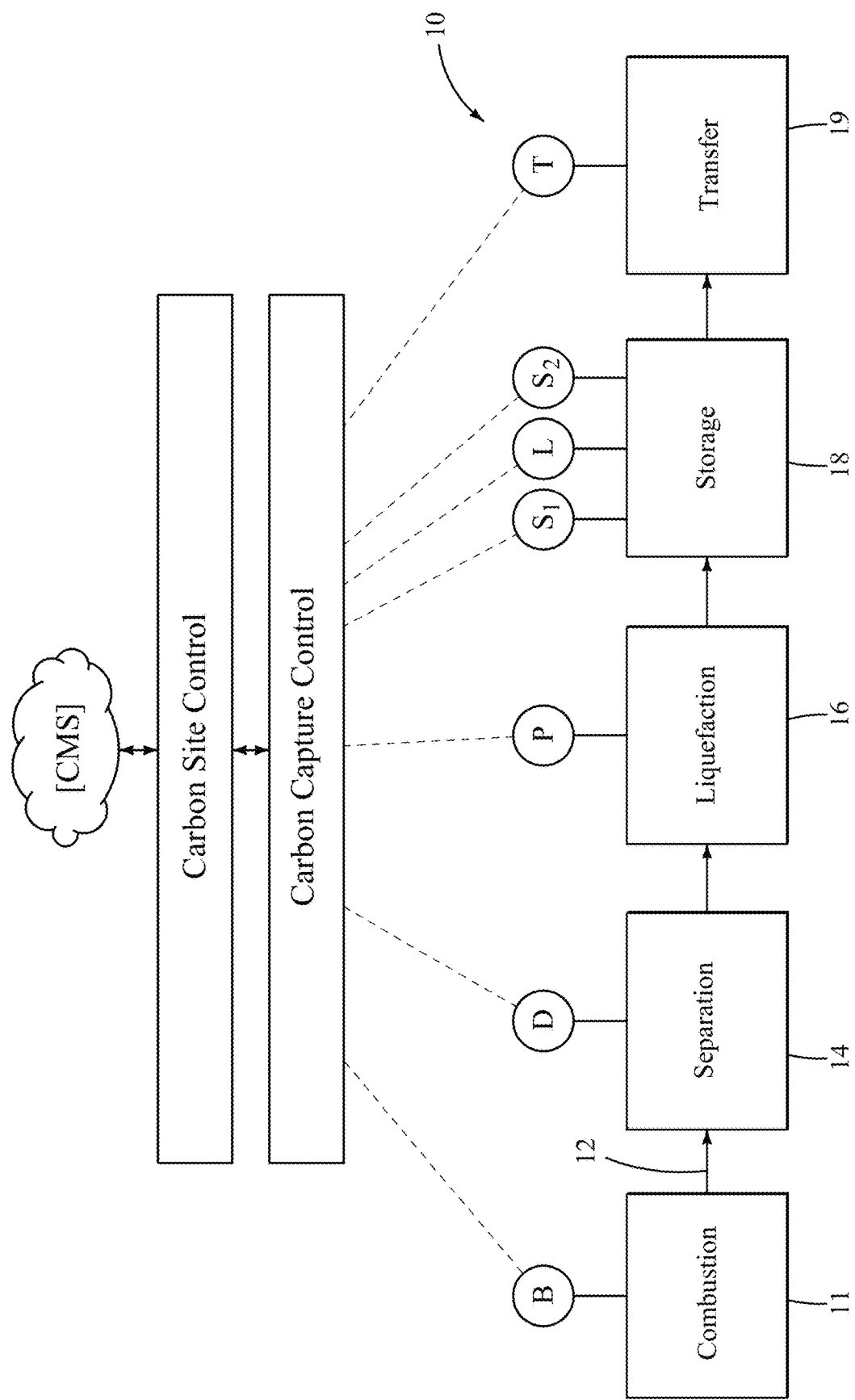
FIG. 9 is a depiction of processing circuitry systems in relation to flue gas processing according to an embodiment of the disclosure.

Referring to FIG. 9, another implementation of the system according to example implementations including carbon management systems above a carbon site control and capture control is described herein. This carbon capture control can include a series of data points B, D, P, $S_1$, L, $S_2$, and T. These data points can be referenced to combustion, separation, liquefaction, storage, and transfer. Data points can have ranges that the system operates within, and can also indicate ranges to operate in relation to other ranges. For example, if combustion is relatively slow and $CO_2$ generation is relatively low, separation may be restrained or operated accordingly, which dictates a change in liquefaction, storage, and transfer.

Figure 10:
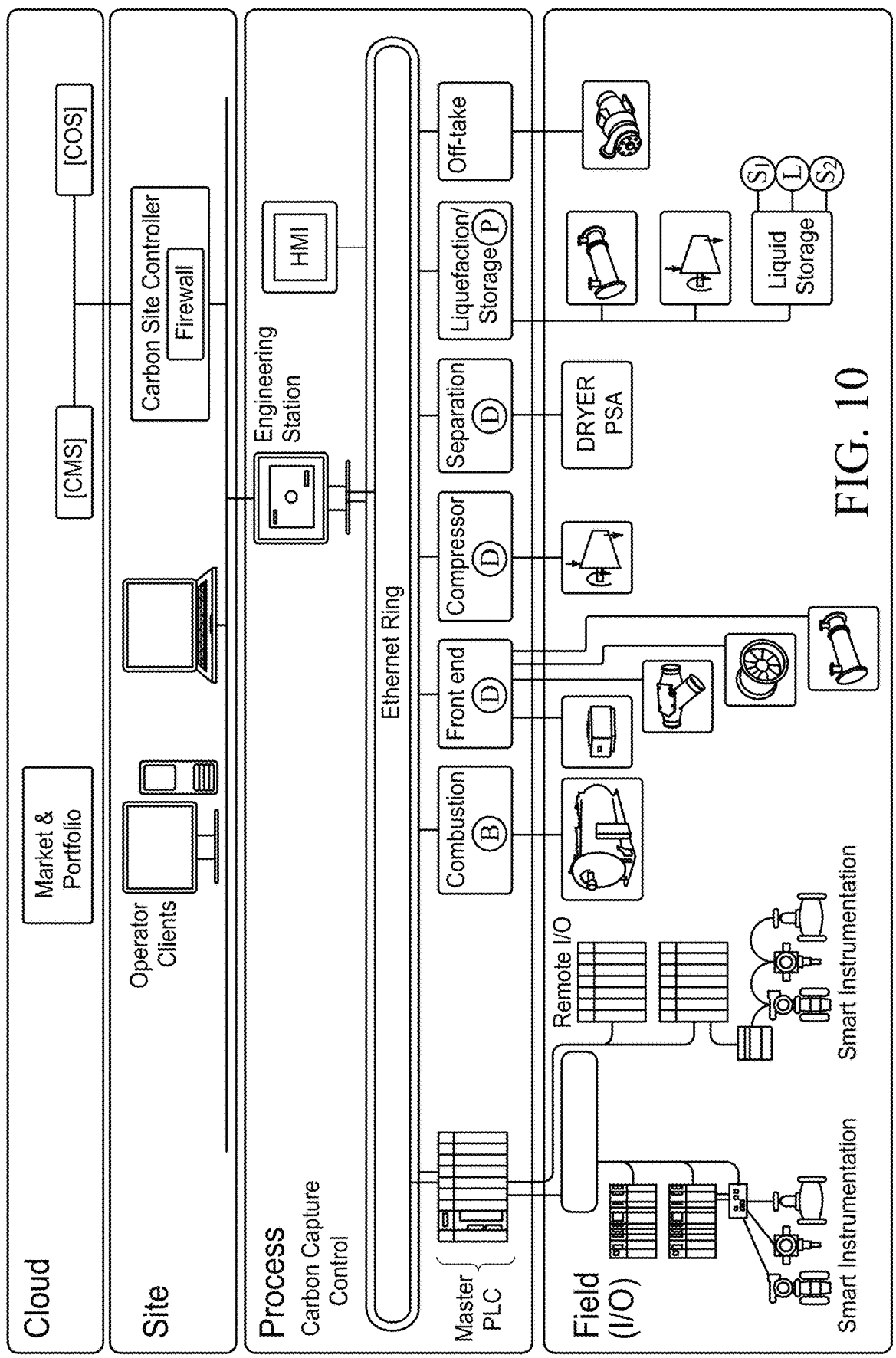
FIG. 10 is a depiction of processing circuitry systems in relation to flue gas processing according to an embodiment of the disclosure.

Referring next to FIG. 10, another example implementation includes the cloud resource, the site resource, and the process resource level, as well as the field resource level. This depiction is referred to in the application referred to and incorporated by reference herein. Accordingly, the cloud can include market and portfolio data, as well as carbon management and carbon optimization systems, which are operably connected to carbon site controller of the firewall.

Referring to FIG. 10, plant, process and field level components of a control system are shown. In accordance with an example implementation, an example overall control system is provided that shows combustion emission and control, MASTER PLC controller, the diverter, the compression, dryer, separation, cooling and compression, refrigeration/storage, and the providing of food grade $CO_2$. These systems are also coupled to utility systems of electricity, natural gas, and water. These control systems exemplify a basic Network Architecture Diagram. The MASTER PLC controls the entire plant with Ethernet loop connections and with Internet IP protocol communications to the Local Packaged controllers, and through direct connection and control to the digital and analog I/O field instrumentation level. The HMI server gathers data from the MASTER PLC, manages plant real time displays, executes logging, data management applications, and communicates through the secure firewall to external users. Also implied is the Engineering Development workstation which maintains all operational software and updates which are periodically downloaded to the MASTER PLC.

Figure 11A:
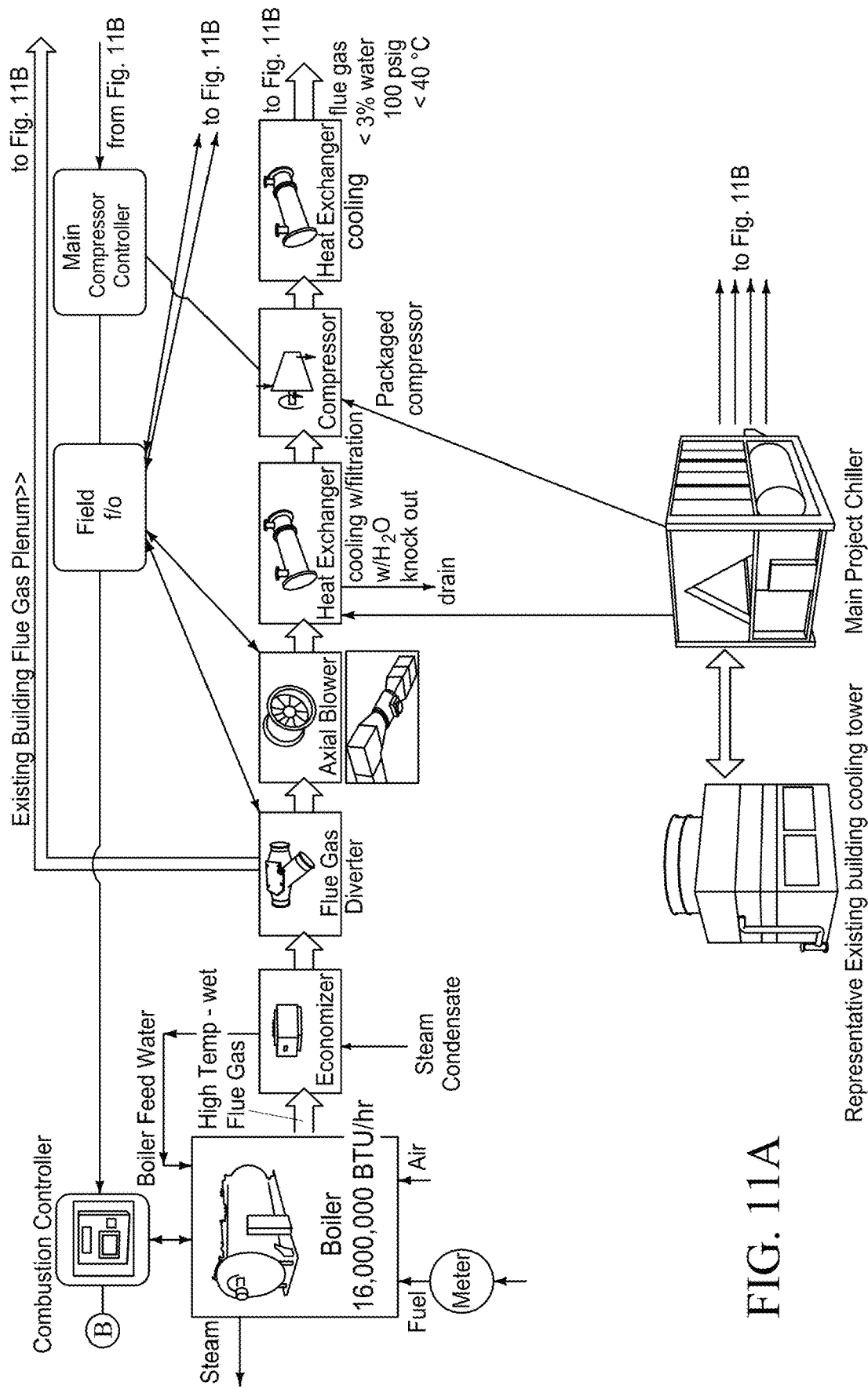
FIG. 11A is a depiction of processing circuitry systems in relation to flue gas processing according to an embodiment of the disclosure.
Figure 11B:
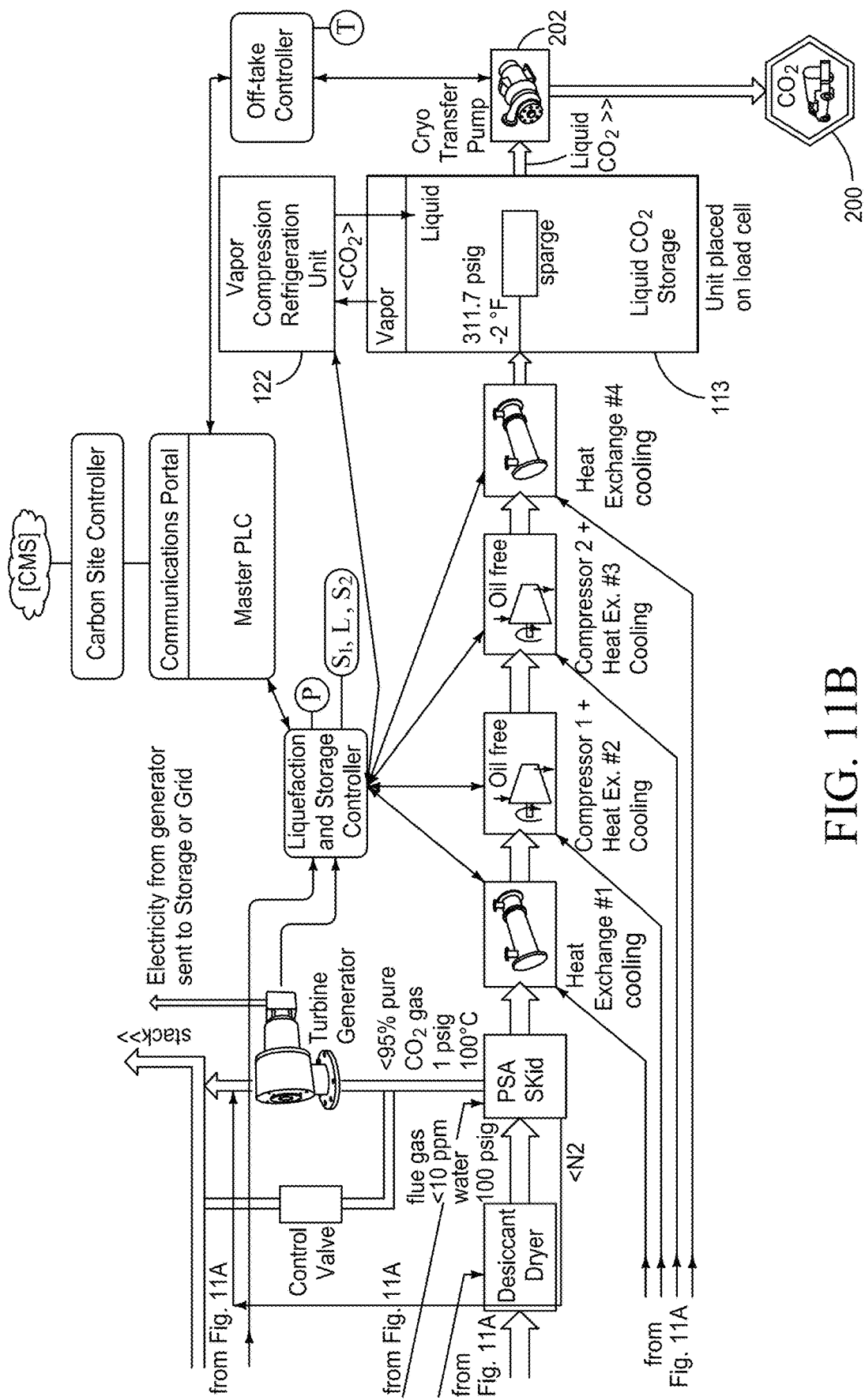
FIG. 11B is a depiction of processing circuitry systems in relation to flue gas processing according to an embodiment of the disclosure.

Referring to FIGS. 11A and 11B, an example implementation of the systems and/or methods is disclosed which details the sequence of the different components and processes described herein, as well as additional thermal management components that are associated with the building. As can be seen throughout the Figures and accompanying description, there are multiple places for heat to be transferred from different components of the disclosed system to existing building systems. For example, as shown, chillers can be in the building, as well as existing cooling towers. These active cooling components can be operably coupled with heat being removed from process components via individual cooling loops. In accordance with example implementations heat, sometimes referred to as waste heat, can be transferred to building systems which can use extra heat to operate more efficiently. Therefore, regarding waste heat from the disclosed system, design preference is to transfer waste heat, firstly to building steam and hot water makeup systems, secondly to the building cooling tower, and finally to an appropriate chiller with heat exchange to air.

Referring next to FIGS. 10-17, numerous examples of building systems are given that can be monitored, manipulated, and/or controlled to operate a building at optimum carbon consumption and/or generation. These examples are given in the context of a buildings carbon capture system; however, buildings may not include this system, rather, the buildings can include heretofore traditional heating/cooling systems that can be monitored, manipulated, and/or controlled using the management systems and/or methods of the present disclosure.

As shown in FIGS. 10 and 11A-B, in accordance with at least one implementation of carbon management, a thermal management system (see, eg., MASTER PLC, controllers, etc.) can conserve use of fuel such as natural gas in the boiler by optimizing the combustion with the combustion controller, control water removal from the flue gas with the front end controller, perform additional separation with the dryer and PSA with the separation controller, liquefy and store $CO_2$ with the liquefaction/storage controller, and dictate off-take to a pickup and/or delivery truck with the off-take controller. These and additional controllers can work to control boiler feed water, potable and/or industrial water, chiller water, and/or cooling tower water, as well as nitrogen expansion cooling to reduce and/or eliminate heat loads in the system. Accordingly, flue gas can be cooled for water knockout, and heat generating electrical components such as compressors, blowers, pumps, and fans can be cooled as well.

In accordance with example implementations, the systems and/or methods of the present disclosure can include an energy storage system that can be configured to include a power conversion component and/or a battery or battery bank component. As one example, energy can be generated via turbine expansion of the nitrogen and this energy can be converted and stored within the building. The energy may be converted and provided directly to system components, for example compressors, and/or provided to the system components after storage, thus lowering building energy demand. Additionally, the energy may be provided to the power grid associated with the building itself.

In accordance with example implementations, using the MASTER PLC, energy generated with the system can be utilized during "peak demand" times (when, for example electricity rates are higher) and/or when the building is utilizing a "peak" amount of power. During these times, the MASTER PLC is monitoring building demand and then modify the system parameters to efficiently use energy storage and/or change carbon dioxide separation, liquefaction, storage, and/or transport to lower energy consumption during "peak demand" thus providing energy cost savings.

Example implementations of the systems and/or methods of the present disclosure can provide not only a carbon capture system but also an improvement in overall building energy efficiency (both thermal and electrical) while lessening $CO_2$ emissions. Example implementations can include lowering carbon fuel consumption through optimizing boiler combustion, providing warmer boiler feed water thus requiring less energy to heat the boiler feed water, warming potable or process water thus requiring less energy to the heat the potable or process water, generating electrical energy and using same to power system components, and/or using building cooling towers to reduce building thermal load, etc., which individually and/or collectively can be part of systems that dramatically improve building efficiency.

Figure 12:
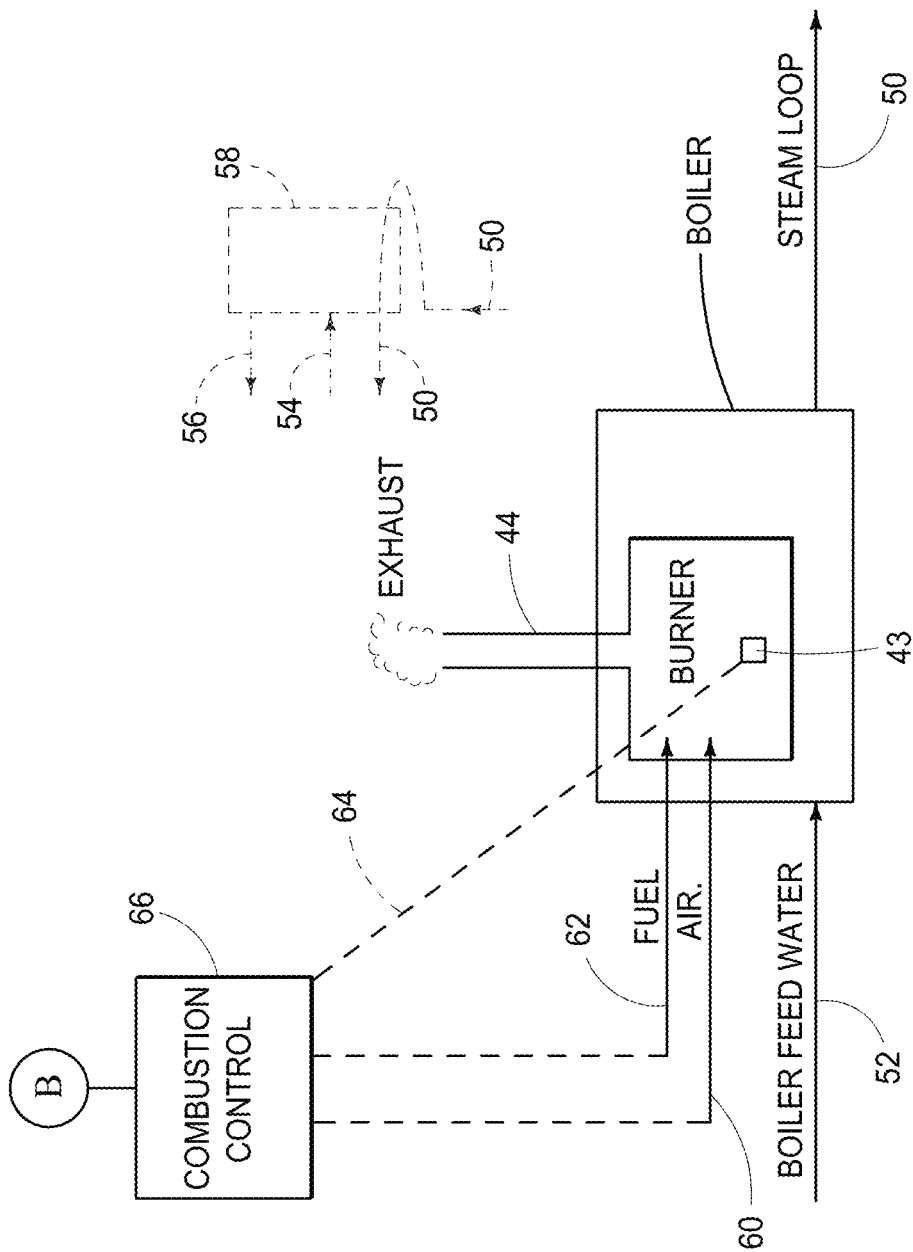
FIG. 12 is a depiction of a flue gas processing component according to an embodiment of the disclosure.

Referring next to FIG. 12, a boiler configured with the systems and/or methods of the present disclosure is depicted. Accordingly, air 60 and fuel 62 can be provided to the combustion burner, the mix of which and accordingly the burn of which is controlled by combustion controller 66 which is operably connected with free oxygen sensor 43. Accordingly, boiler feed water 52 is received by the combustion boiler and heated to hot water or steam 50 which is used to heat the building and/or building systems such as water heater 58. Water heater system 58 can be configured to receive potable water for heating and/or industrial process water for heating.

In accordance with example implementations, control 66 can utilize sensor 43 to monitor the amount of free oxygen in the combustion burner and maintain the amount of free oxygen to about 3%. About 3% free oxygen can include free oxygen from 3 to 7%. In accordance with example implementations, combustion can generate flue gas 44. The composition of flue gas 44 can be controlled to include at least about 10% carbon dioxide. About 10% carbon dioxide can include carbon dioxide from 9 to 12% of the flue gas from combustion of natural gas.

The systems and/or methods of the disclosure can include separating the carbon dioxide from the flue gas, liquefying the carbon dioxide after separating the carbon dioxide from the flue gas, liquefying the separated carbon dioxide after separating the carbon dioxide from the flue gas, storing the carbon dioxide after liquefying the carbon dioxide, and/or transporting the carbon dioxide after storing the carbon dioxide.

Referring to FIG. 12, systems and/or methods for operating the combustion boiler within the building are provided that can include combusting air and fuel within the burner to produce flue gas 44 having an oxygen concentration; and restricting air from the flue gas by substantially eliminating tramp air within the conduit operably aligned to convey flue gas from the burner.

In accordance with at least one aspect of the present disclosure, real time control of the combustion source, or boiler, can achieve higher efficiency to reduce consumption of natural gas or fuel, for example, while increasing the concentration of carbon dioxide in the flue gas. This may be considered counter intuitive to increase the concentration of carbon dioxide in the flue gas when the systems and/or methods of the present disclosure are being utilized to reduce carbon emissions from a building. However, increasing carbon dioxide concentration can provide the benefit of decreasing fuel consumption by reducing heat loss through the exhaust. Adjusting combustion to control free oxygen to 3% can give a higher efficiency burn. In accordance with example implementations, through combustion control, it is desirable to approach the 12% concentration value of $CO_2$, when burning natural gas, and achieve at least about 10% carbon dioxide concentration of the flue gas. This is at least one feature of the disclosed building emission processing systems and/or methods and can be utilized as one of the initial steps in carbon capture.

Within the building, boiler operation can be dictated by responding to the need for hot water or steam by controlling the combustion burner to various predetermined firing rates; 1) an off condition, 2) a low fire rate, and/or 3) a high fire rate. These rates may have been established on older boilers through calibrated mechanical linkages, for example. Recognizing that cyclic boiler operation will vary widely from hour to hour, day to day, and season to season, it is desired to establish automatic control of the flame rate continuously across the entire boiler load range, while also controlling free oxygen as discussed above. The systems and/or methods of the present disclosure can be configured to reduce on-off cycles by extending boiler run time at a reduced flame rate, increasing the life on the boilers, and providing a more continuous flow of flue gas to the separation, liquefaction, storage and/or transport systems and/or methods of present disclosure.

Accordingly, the boiler and system controls (for example FIG. 10) can achieve higher building thermal efficiency, while creating optimal conditions for flue gas supply to the systems and methods of the present disclosure.

Referring next to FIGS. 13A-C, multiple portions of systems and methods are depicted for separating water from flue gas as well as cooling the flue gas. Referring first to FIGS. 13A-4C, three different configurations of systems and/or methods for cooling flue gas from a combustion boiler within a building are depicted. Referring first to FIG. 13A, flue gas 44 can proceed to a combination non-condensing and condensing economizer 60a. Flue gas 44 first proceeds to a non-condensing configuration in which boiler feed water 52 is provided through a conduit, set of conduits, and/or coils and flue gas is cooled and the boiler feed water heated. Accordingly, methods for cooling flue gas from a combustion boiler within a building are provided. Upon heating the boiler feed water, it can be provided to the boiler thus lowering the necessary energy required to heat the feed water to hot water and/or steam.

Additionally, the economizer can be configured for condensing. Accordingly, a conduit, set of conduits, or coils 54 can be configured to convey potable or industrial process water that is received from a utility for example. This water can have the temperature close to that of ground water as it is conveyed through typically underground pipes. Accordingly, the water has a substantially different temperature than the flue gas, even after being partially cooled in the non-condensing economizer. The providing of the flue gas to these conduits can remove water from the flue gas thus creating a water condensate effluent 53. This water proceeding through the conduits can be heated and provided to a water heating system 58 (FIG. 12) as water heating system water intake 54, heated and received through outlet 56. Accordingly, the amount of energy needed to heat the water within water heating system 58 is less for at least the reason the water received for heating does not need to be heated from the lower temperature associated with typical utility water, rather it had been preheated. In accordance with an alternative configuration, and with reference to FIG. 13B, one set of coils 52 can be associated with one economizer 60b, and another set of coils 54 can be associated with another economizer 65a. In this configuration, economizer 60b can be a non-condensing economizer and economizer 65a can be configured as a condensing economizer. In accordance with another embodiment of the disclosure, a diverter 64 can be operably coupled to the economizers as shown in FIGS. 13A-C. In accordance with example implementations, the cooled flue gas can be provided from diverter 64 using a blower. The systems and/or methods can control the amount of flue gas to be processed using the diverter. In accordance with example implementations, the current system in accordance with FIG. 13C is going to receive 450 Standard Cubic Feet per Minute (SCFM) to 500 SCFM of wet flue gas 44. This diverter can be controlled by the overall master system (FIG. 10) which can control the motor operated butterfly valve within the diverter. The master system can also collect gas temperature and flow data, and operate the blower as shown in FIG. 14.

Referring next to FIG. 14, flue gas drying can continue with a blower 68 to increase pressure of flue gas from the diverter. This blower 68 can support flow through the heat exchanger/condenser 70 with can include a water outlet 71 operatively coupled to an acid quench assembly 74. Heat exchanger 70 can be configured to cool the gas below dewpoint to condense out most water leaving less than about 3% water or as low as approximately 0.2% water.

Heat exchanger 70 can be a tube and shell configuration, cooled by an external water/glycol loop provided from a chiller and/or water from the building cooling tower for example. As shown, the water removed from the system at heat exchanger 70 can be slightly acidic, and it is anticipated that the water can be neutralized before proceeding to a Publicly Owned Treatment Works (POTW) or through a sewer system. Additionally, some water will remain in the process stream as small micro droplets, mist, or acidic aerosols which will be minimized or removed with special heat exchanger designs, impingement devices, or possibly a precipitator.

After a preponderance of water has been removed, and acidic aerosols mitigated, the cooled flue gas 72 can continue on to a compressor to increase pressure of the flue gas to an optimum level of approximately 100 psig, or lower, as dictated by the PSA system specification.

Referring next to FIG. 15, compressor 74 can receive flue gas 72. Compressor 74 can be an "oil free" compressor to eliminate downstream product contamination, and the compressor can be configured with variable frequency drives (VFD's) to respond to variable gas flows. Compression can raise the temperature of the flue gas, so a second heat exchanger 76 can be utilized to lower the temperature of the flue gas to less than 40° C. At this stage, the gas can have less than about 3% water which can exist as a vapor, the gas can be less than 40° C. temperature, and can be about 100 psig in pressure.

Referring to FIG. 15, the systems and/or methods for separating carbon dioxide from flue gas generated from a combustion boiler within a building can include providing flue gas 72 having less than about 3% water; compressing the flue gas; and cooling compressor 74 with a heat transfer fluid 90 and providing the heat transfer fluid to/from a chiller and/or a cooling tower. The heat transfer fluid can be water for example, and the water of the chiller can be cooled within a cooling tower of the building before returning spent heat transfer fluid to the chiller. Accordingly, the systems and/or methods of the present disclosure can include additional separation, liquefaction, storage, and/or transport. This is just one example of the heat generating components of the system that can be cooled with chiller and/or cooling tower heat transfer fluid. Over 70% of the cooling requirement for the systems and/or methods of the present disclosure can come from heat generated in compressors and/or pumps, and from heat exchangers on the liquefaction skid. Each of these components can be provided with a water cooling circuit supplied from a local chiller or directly from the central chiller. The local chiller can be water cooled with a water loop coming from the central chiller or from cooling water from the building cooling tower. The central chiller can be designed to prioritize heat transfer in the following order: a) domestic hot water makeup; b) cooling tower; c) exchange with outside air, for example.

Referring again to FIG. 15, after compression the flue gas can be provided to a dryer 78, such as a desiccant dryer. Dryer 78 can be operatively engaged with a nitrogen feed, such as a sweep feed, configured to regenerate spent desiccant. Typically, the dryer is a two-chamber cycling device, wherein one chamber is drying while the other chamber is re-generated for drying, and those cycles continue. The nitrogen can be provided to spent desiccant in one chamber while the other chamber is drying flue gas. Accordingly, systems and/or methods for separating carbon dioxide from flue gas generated from a combustion boiler within a building are provided that can include drying the flue gas using nitrogen recovered during separation of carbon dioxide recovered from the flue gas. This recovered nitrogen can be conveyed from the pressure swing adsorption assembly 80 via conduit 92 to dryer 78 and then exhausted through the stack 86. In accordance with example implementations, the dried flue gas can be provided for additional separation, liquefaction, storage, and/or transport.

From the dryer, the flue gas 79, containing less than 10 ppm water, can proceed to pressure swing adsorption (PSA) assembly 80. This pressure swing adsorption assembly can provide greater than 85% $CO_2$ recovery, at greater than 95% purity, at 1 psig, and at 100° C. Maximum $CO_2$ output flow at this point can be approximately 40 SCFM. The remainder of the flue gas, mostly nitrogen may continue under pressure, and/or be split with a portion returning to dryer 78. Another portion of the nitrogen can proceed to a turbine expander 82/generator 93 which can provide electrical energy 94 and a cold output gas, at near ambient pressure. Additionally, a control valve 84 equipped with a silencer can be operationally aligned in parallel with expander 82/generator 93.

Accordingly, methods for separating carbon dioxide from flue gas generated from a combustion boiler within a building are provided that can include removing at least some of the nitrogen from the flue gas to produce greater than about 95% carbon dioxide 78 using a pressure swing adsorption assembly 80. Nitrogen removed from the flue gas can be used to remove water from the flue gas before providing the flue gas to the pressure swing adsorption assembly, in dryer 78, for example. Alternatively, or additionally, at least some of the nitrogen removed from the flue gas can be provided to a gas expander/generator. Alternatively, or additionally one part of the nitrogen from the PSA can be provided to a control valve equipped with a silencer and providing another part to the expander/generator. In accordance with example implementations, the systems and/or methods of the present disclosure can include separating the nitrogen into parts and providing one part to the dryer and another part to the expander/generator. In one example implementation, the one part is about a third of the nitrogen from the pressure swing adsorption assembly.

Systems and/or methods are also provided for cooling carbon dioxide separated from flue gas generated from a combustion boiler within a building using the nitrogen exhaust of a PSA. The systems and/or methods can include separating nitrogen from flue gas using pressure swing adsorption assembly 80, and expanding the nitrogen through a turbine within the presence of a heat exchanger 92 to cool fluid within heat exchanger 92; and transferring that cooled fluid to another heat exchanger 100 operably aligned with the carbon dioxide product of the pressure swing adsorption assembly to cool the carbon dioxide product 78. The turbine can be part of a generator 93, for example, or may be provided to cool exchanger 92.

Typically, the nitrogen gas exiting the PSA can be at least 85 psig, with a flow exceeding 65% of the rated system flow. In accordance with example implementations, the nitrogen may be processed and saved as a marketable product. With regard to the electricity generation, grid compatible power conversion will be needed. The turbine generator will have a 500 Hz output which is not compatible with a 60 Hz grid. Therefore, it is envisioned that appropriate power conversion will be specified. This can be rectification followed by DC to AC multi phase inverter with proper safety features in case of a building power outage. After use in the turbine generator, and in the $CO_2$ heat exchanger, the nitrogen waste gas can proceed back to the exhaust stack or plenum.

Referring next to FIG. 16, in another series of components of the present disclosure, the >95% pure $CO_2$ 78 can be cooled and compressed in sequential steps as shown in heat exchangers 104, compressors 106 and 108, and heat exchanger 110 with compressors operatively engaged with cooling transfer fluid 90 to approach the phase change state for liquefaction. In accordance with example implementations, the >95% pure $CO_2$ can have a temperature coming out of the PSA of as high as 100° C. As described, a heat exchanger can be provided to lower the temperature of the gas to a sufficient temperature and then compress the gas to a higher pressure. It can also be provided to raise the temperature of nitrogen gas coming off of the PSA prior to expansion through the turbine. This can improve turbine efficiency by allowing full use of nitrogen flow before exceeding the COLD temperature output limit. This is just one of several examples of utilizing heat from system components at other portions of the system to derive a more efficient overall system.

Referring next to FIG. 17, a $CO_2$ liquefaction and storage system and/or method is shown wherein $CO_2$ gas 112 is sparged inside a vessel 113 such as an insulated vessel. Example insulated vessels can include but are not limited to vacuum jacketed liquid storage tanks. Within this vessel, gas 112 can be converted to a liquid 114. In accordance with example implementations, gas 112 can be provided to sparge assembly 118 where it is provided as sparged gas 120 which liquefies upon sparging into liquid 114.

Vapor 116 at the top of vessel 113 is managed by a refrigeration system 122 which cools vapor 116, which condenses back to liquid 114, which returns back into vessel 113. In accordance with example configurations, system 122 can be configured as a loop in fluid communication with vessel 113 wherein vapor $CO_2$ 116 enters system 122 and returns to vessel 113 as a liquid $CO_2$ 114. In at least one configuration, system 122 is configured as a low temperature condenser equipped with an evaporator.

In the event of building power loss, the superior insulation of a vacuum jacketed tank, for example, may maintain liquid $CO_2$ for at least 30 days. In accordance with example implementations, the building itself may be able to tap into vessel 113 for a supply of $CO_2$ to extinguish fires; for example, fires related to electronic components that require $CO_2$ extinguishing methods.

FIGS. 18-23 are example depictions of interface readouts received by operators of the optimization and/or management systems according to example implementations. In accordance with at least some of these readouts, carbon intensity can be determined and then processed to optimize carbon capture according to the systems and methods described herein. This intensity can be determined in real time.

Figure 19:
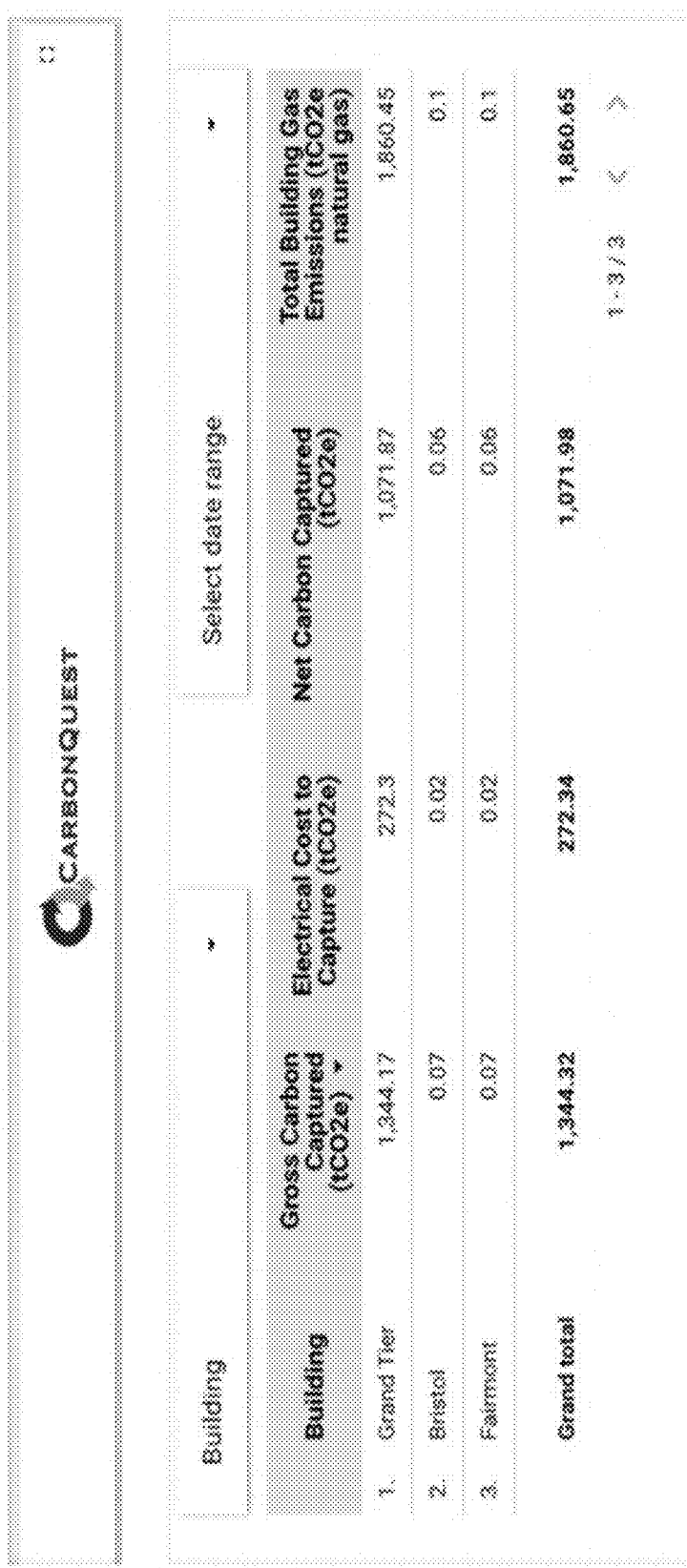
Figure 21:
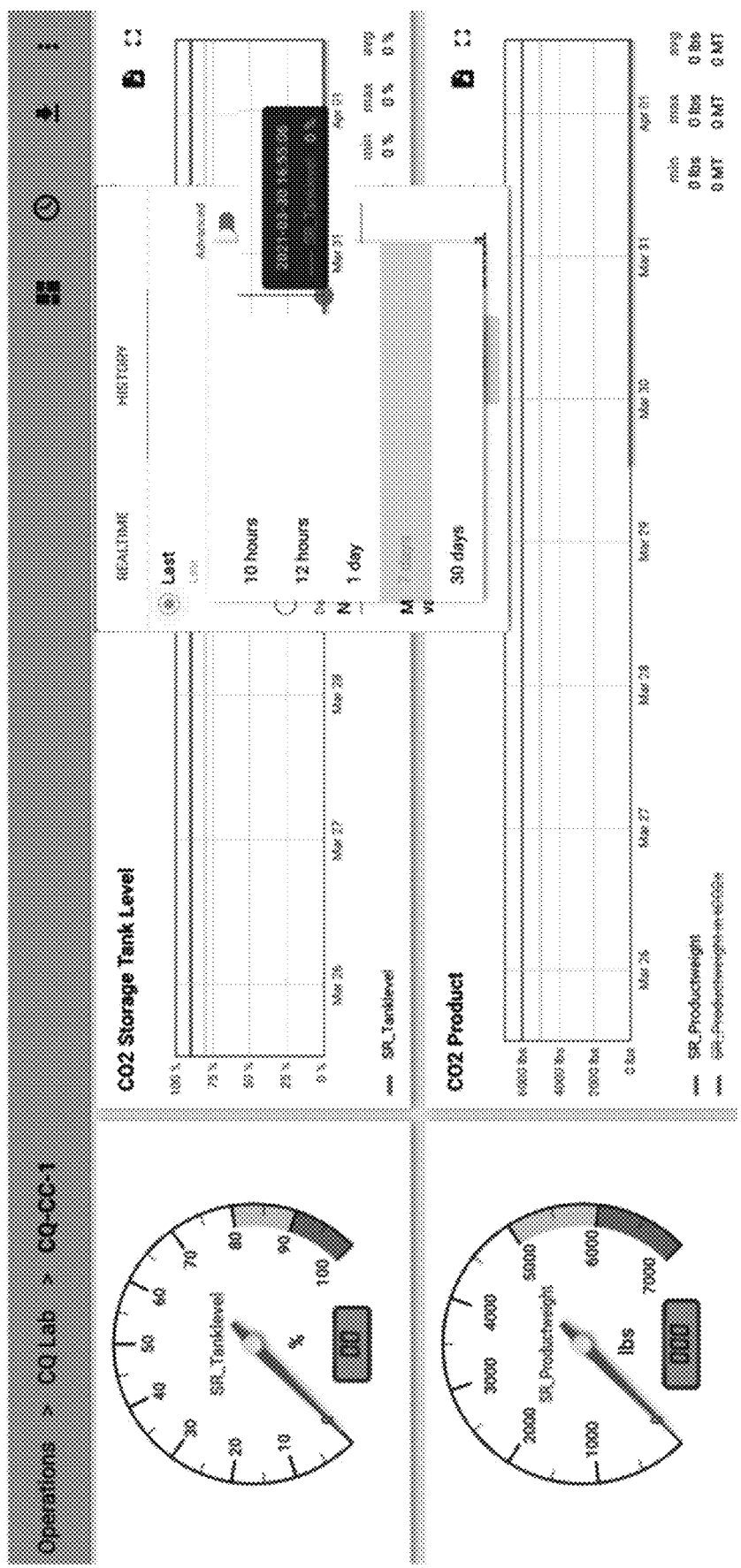
Figure 22:
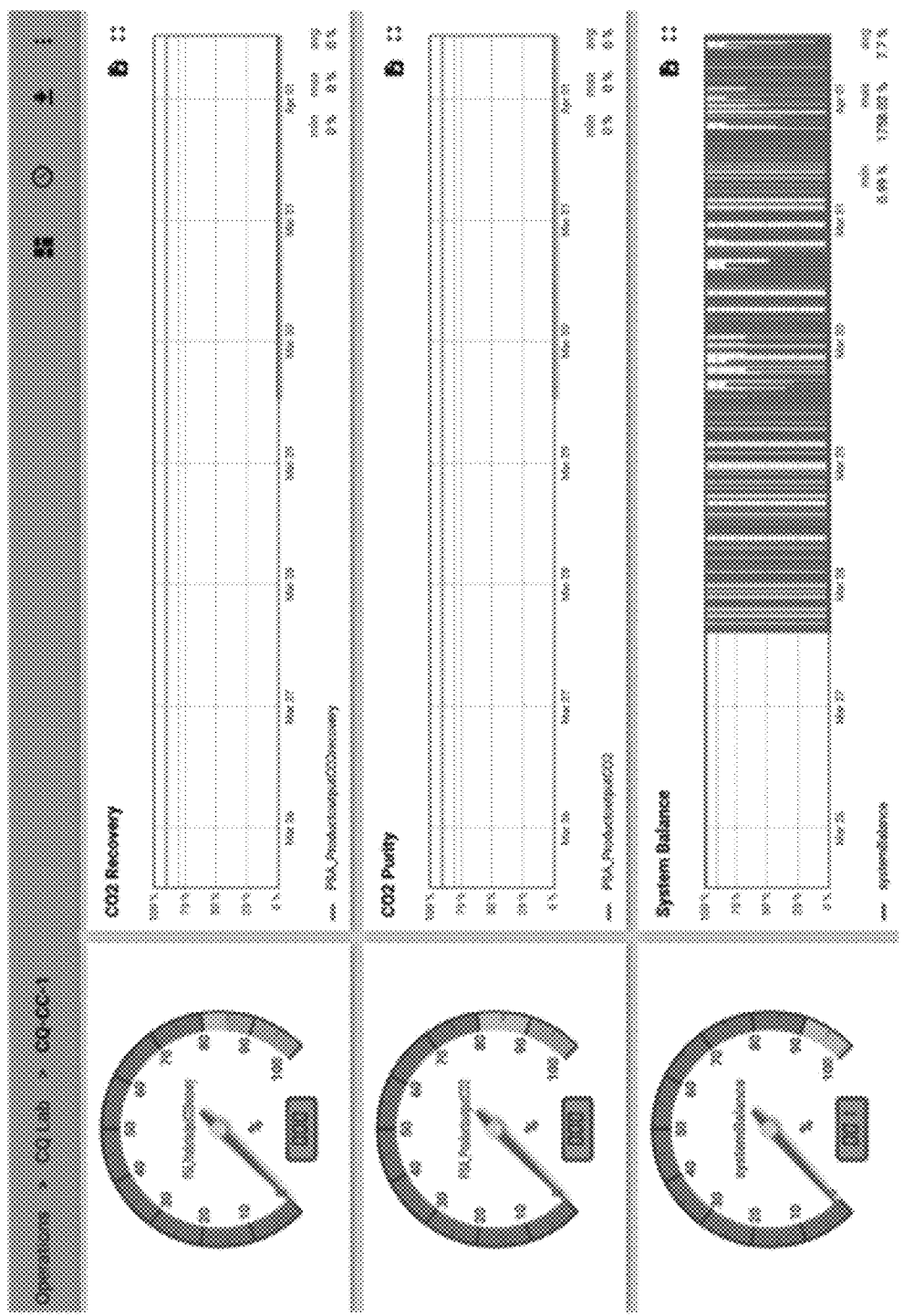
Figure 23:
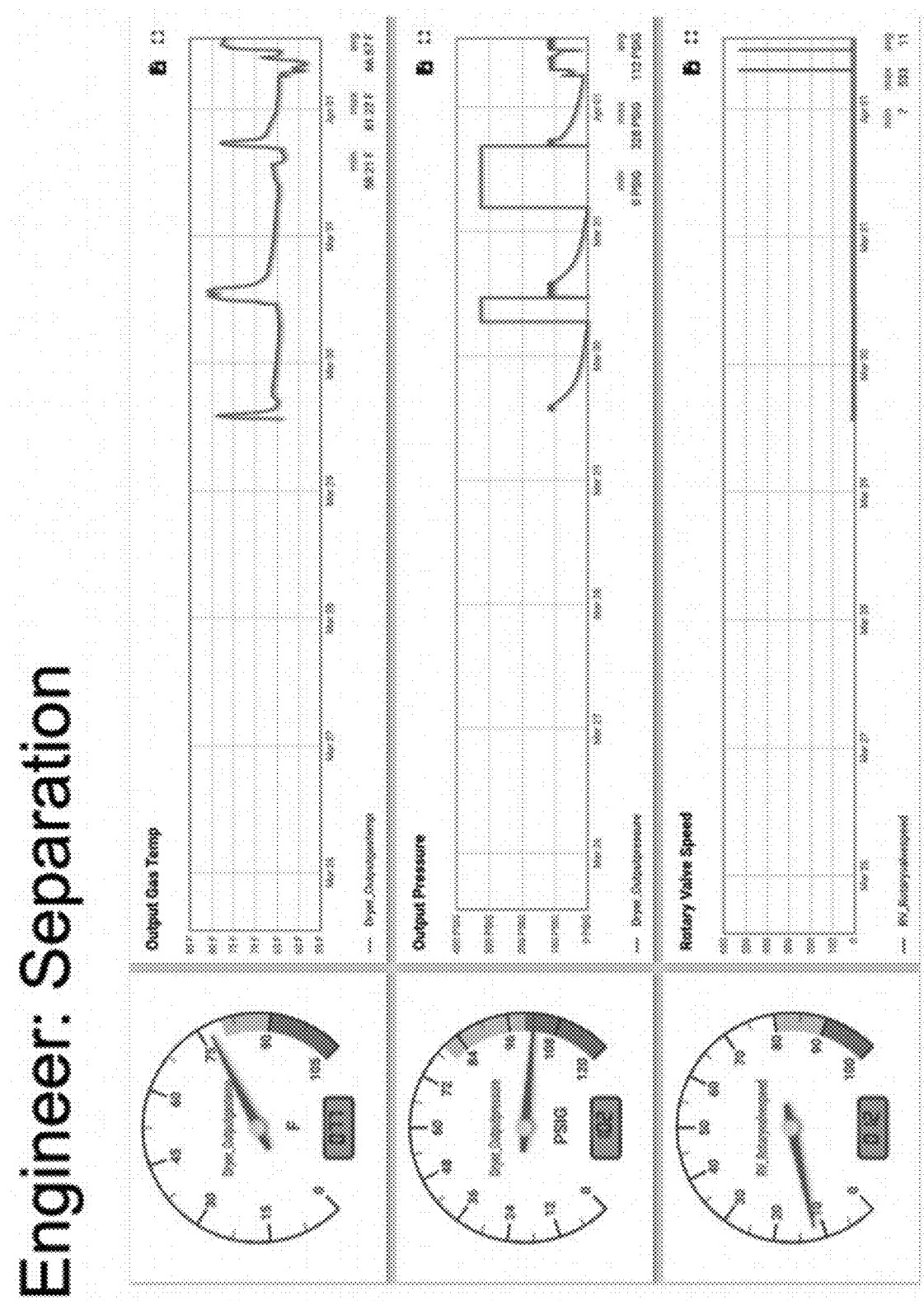

FIGS. 19 & 20 show examples of the CMS calculated performance of the carbon capture system. This data can be collected in real time and aggregated on a daily, weekly, monthly and annual basis to show the performance of the system. Gross Tons of $CO_2$ captured and the Net tons of $CO_2$ reduced (after removing the electrical equivalent in real time as calculated with the CMS) are presented and tracked and presented as required by the particular market the system is operated within. Additionally, as required by the market, the system tracks the $CO_2$ offtake and final utilization of the $CO_2$ product and its percentage of sequestered value as represented by each offtake application and market dictates. This CMS capability therefore tracks and calculates the full Carbon Lifecyle and Carbon Lifecycle Analysis of the system in real time and aggregates the results on a daily, weekly, monthly and annual basis providing a user interface and reports of the system decarbonization performance.

FIG. 24 is a depiction of a system for machine learning operations architecture that includes analysis, versioning, transform, $CO_2$ capture, model, $CO_2$ reduction, predictive maintenance, $CO_2$ forecast, anomaly detection, prediction, deployment, evaluation, training, and data ingestion.

FIG. 25 is a loop depiction of the carbon management system which includes carbon capture management, as well as in relation to building management systems, and the optimization route that takes place using the machine learning of FIG. 24. The COS architecture interfaces to the CMS using a software construct entitled a Carbon Conservation Measure (CCM). Each CCM acts as a container for a specific Machine Learning algorithm that is configured, scheduled and assigned to a specific carbon consuming device, devices or system. The CCM interfaces to the BMS via a standard protocol and data architecture which enables the software to work with any BMS system connected to carbon consuming devices. Multiple CCMs may be configured and applied at the same time to the BMS as applicable for each building specific embodiment.

FIG. 26 is another depiction of the reinforcement machine learning (RML) system for building decarbonization optimization that includes the field devices, communicating through the BMS, their respective data sets to the interpreter and agent. Examples include various state data including current set point, various control variables (temperatures, pressures, flows, metering, occupancy, and/or humidity, for example). This data can be used to by the interpreter algorithm to calculate a reward. The interpreter algorithm considers building "comfort" conditions and decarbonization results together to determine if the previous action resulted in an optimal condition as defined by the algorithm. The reward value will vary based on how well the previous iteration of the agent performed. The agent receives the reward and state data and then using its machine learning algorithm determines the optimal actions to send to the building environment (building systems and devices) for control. The continuous loop of decarbonization optimal control utilizes the interpreter and reward system to continuously reinforce the positive results and enables the system to continuously learn the optimal actions across a constantly varying set of environment conditions. As seasons and building conditions continuously evolve, the RML system adapts and continues to learn and deliver optimal decarbonization results while considering the building environment and comfort. The algorithm can be tuned such that it weights "comfort" and "decarbonization" differently for each building application to ensure that the owners can be delivered the right balance of each that meets their preference. Additionally, the algorithm can be configured with an absolute control bound which it seeks to not exceed and manage the windows of available optimal control conditions.

All of the above can be configured separately within the bounds of a specific configured Carbon Conservation Measure (CCM) which embodies and particular algorithm and its configuration as stated above for a specific device. As an example a Package AC Unit (PAC) in the lobby may be different from a PAC in the Gym or a Rooftop HVAC unit controlling a particular zone will have a different CCM as another zone. This provides for flexibility to continuously optimize all the systems/sub-systems within the buildings separately and autonomously to deliver the combined benefit of a building carbon optimization. It should be noted that RML is very computational heavy and generally not performed at a site. Remote or cloud COS leverages multiple RML applications within the cloud COS for each building to optimally control a device. If the cloud connection is lost, the device defaults to configured setpoint control.

FIG. 27 is another system according to an embodiment of the disclosure that includes the CMS and COS in a cloud that is related to a gateway site that includes a delta building management system detection configuration. The system itself includes PACs 1-4 as well as rooftop units 1-2, for example, and cooling tower systems as well as boiler systems. This embodiment is an example of using a standard BMS protocol the enables the Carbon Site Gateway to communicate to any standard based BMS.

Additionally the embodiment provides an example of a variety of devices that consume carbon resources in a building. The devices generally interface through the BMS, but may interface directly via MQTT. Any device that provides lighting, heating, cooling systems and/or supporting subsystems that can be controlled for operation may be included in an embodiment which the COS framework may operate against.

FIGS. 28-29 demonstrate real time data that can be acquired utilizing the systems and methods of the present disclosure. The CMS/COS systems utilize methods of baselining system performance and comparing these conditions against actual performance to determine the carbon reduction results. These results are reported on a real-time basis and aggregated daily, weekly, monthly and annually to show the decarbonization performance of the independent and aggregation of CCM's. This data is combined with the carbon capture system performance measurement to show the total building decarbonization results and compliance with regulatory measurements as specified by each market.

Referring next to FIG. 30, an example system is provided that provides more detail regarding the machine learning that takes place at the carbon optimization system level where rewards are calculated and new setpoints are calculated to optimize rewards. This particular example is given in the context of summer cooling where the COS is coupled to the carbon site controller which is also coupled to the building management system, and rooftop units and the cooling tower are coupled to the building management system and showing baseline and results as data shown with T=0 and T=N.

FIG. 31 is an even more detailed example water heating with carbon optimization. As shown, the carbon optimization system is set to control and optimize units at different temperature levels and utilizing the boiler conditions necessary to optimize units at different temperature levels.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A carbon management system for managing combustion of a carbon resource to produce flue gas, and carbon dioxide separation, purification, and transport of the purified carbon dioxide within a plurality of distinct buildings, the system comprising:
a plurality of distinct buildings, each building comprising:
a combustion source that produces flue gas from combustion of a carbon resource to produce hot water or steam for building systems, wherein the carbon resource is operably coupled to a carbon resource module that receives carbon resource data:
a carbon capture system operably engaged with the combustion source and configured to:
receive flue gas from the combustion source;
remove water from the flue gas;
separate nitrogen from the flue gas;
liquefy carbon dioxide from the flue gas; and
store and/or transport the liquified flue gas, wherein the carbon capture system is operably coupled to a carbon capture control module that receives combustion source data and carbon capture system data;
a building management system operably engaged with the combustion source and temperature control devices throughout the building to receive data and control production of hot water or steam for building systems; and
a carbon site control module configured to process data received from and provide control of each of the carbon resource module, the carbon capture control module, and/or the building management system; and
carbon management processing circuitry configured to receive and process data from one or more of the modules of each of the distinct buildings and provide instructions to carbon site control for the separation, purification, and transportation of purified carbon dioxide from the flue gas.

2. The carbon management system of claim 1 wherein the carbon managed is the carbon dioxide and the carbon source.

3. The carbon management system of claim 1 wherein the plurality of buildings are one or more of a residential building, a factory, and/or an office building.

4. The carbon management system of claim 1 wherein the carbon management processing circuitry is operably engaged with one or more of a carbon transport vehicle and/or a carbon repository.

5. The carbon management system of claim 1 further comprising a carbon optimization system operably engaged with the carbon site control module and configured to use machine learning to optimize one or more of the combustion source, the carbon capture system, and/or the building management system.

6. The carbon management system of claim 5 wherein one or both of the carbon management system and/or the carbon optimization system is operably engaged with one or more of an electricity carbon source, a natural gas carbon source, and oil carbon source, and/or a steam carbon source.

7. The carbon management system of claim 1 wherein the carbon capture system further comprises compressing the flue gas.

8. The carbon management system of claim 1 further comprising a user interface of the building management system.

* * * * *

UNITED STATES PATENT AND TRADEMARK OFFICE
CERTIFICATE OF CORRECTION

| | | |
|---|---|---|
| PATENT NO. | : 12,367,498 B2 | Page 1 of 1 |
| APPLICATION NO. | : 17/963592 | |
| DATED | : July 22, 2025 | |
| INVENTOR(S) | : Ken Byrd and Shane Johnson | |

It is certified that error appears in the above-identified patent and that said Letters Patent is hereby corrected as shown below:

In the Claims

Column 15, Line 37 – Replace "liquified flue gas, wherein" with --liquified carbon dioxide, wherein--

Signed and Sealed this
Twenty-eighth Day of October, 2025

John A. Squires
*Director of the United States Patent and Trademark Office*